(12) United States Patent
Kuroda et al.

(10) Patent No.: US 7,054,247 B2
(45) Date of Patent: May 30, 2006

(54) INFORMATION STORAGE MEDIUM WITH WOBBLED GROOVE HAVING WOBBLE PERIOD BASED ON MULTI-FREQUENCY SHIFT KEYING

(75) Inventors: Kazuto Kuroda, Kawasaki (JP); Hideo Ando, Hino (JP); Kazuo Watabe, Yokohama (JP); Shintaro Takehara, Yokohama (JP); Akihito Ogawa, Yokohama (JP); You Yoshioka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 373 days.

(21) Appl. No.: 10/329,985

(22) Filed: Dec. 27, 2002

(65) Prior Publication Data

US 2003/0169658 A1    Sep. 11, 2003

(30) Foreign Application Priority Data

Dec. 28, 2001    (JP)    ............................. 2001-401103

(51) Int. Cl.
G11B 7/005    (2006.01)
G11B 7/24    (2006.01)
(52) U.S. Cl. ................... 369/47.35; 369/275; 369/47.3
(58) Field of Classification Search ............. 369/275.4, 369/44.13
See application file for complete search history.

(56) References Cited

U.S. PATENT DOCUMENTS 4,905,256 A * 2/1990 Laurent ....................... 375/275

5,450,086 A * 9/1995 Kaiser .......................... 342/42
5,999,504 A * 12/1999 Aoki ......................... 369/47.4
6,301,212 B1 * 10/2001 Kubo et al. ................ 369/53.2
6,442,119 B1 * 8/2002 Sunagawa ................ 369/47.53

FOREIGN PATENT DOCUMENTS

| CN | 1309397 A | 8/2001 |
|---|---|---|
| JP | 54-160211 | 12/1979 |
| JP | 60-677 | 1/1985 |
| JP | 9-27127 | 1/1997 |
| JP | 9-106549 | 4/1997 |
| JP | 10-124878 | 5/1998 |
| JP | 2840631 | 10/1998 |
| JP | 2844638 | 10/1998 |
| JP | 10-312639 | 11/1998 |
| JP | 2001-118244 | 4/2001 |
| JP | 2001-118255 | 4/2001 |
| JP | 2003-342941 | 11/2002 |
| JP | 2003-187458 | 7/2003 |

OTHER PUBLICATIONS

Japanese Patent Office Action dated Feb. 10, 2004.
Chinese Office Action, dated May 14, 2004 for Patent Application No. 02160831.8.
U.S. Appl. No. 10/073,911, filed Feb. 14, 2002, Watabe et al.

(Continued)

*Primary Examiner*—Brian E. Miller
*Assistant Examiner*—Peter Vincent Agustin
(74) *Attorney, Agent, or Firm*—Pillsbury Winthrop Shaw Pittman, LLP

(57) ABSTRACT

An information storage medium according to an embodiment of this invention includes a wobbled groove having a wobble period modulated by multi-frequency shift keying corresponding to playback control information.

3 Claims, 20 Drawing Sheets

OTHER PUBLICATIONS

U.S. Appl. No. 10/329,983, filed Dec. 17, 2002, Watabe et al.
U.S. Appl. No. 10/330,010, filed Dec. 27, 2002, Yoshioka et al.
U.S. Appl. No. 10/330,012, filed Dec. 27, 2002, Ogawa et al.
U.S. Appl. No. 10/331,940, filed Dec. 31, 2002, Takehara et al.

* cited by examiner

INFORMATION STORAGE MEDIUM WITH WOBBLED GROOVE HAVING WOBBLE PERIOD BASED ON MULTI-FREQUENCY SHIFT KEYING

CROSS-REFERENCE TO RELATED APPLICATIONS

This application is based upon and claims the benefit of priority from the prior Japanese Patent Application No. 2001-401103, filed Dec. 28, 2001, the entire contents of which are incorporated herein by reference.

BACKGROUND OF THE INVENTION

1. Field of the Invention

The present invention relates to an information storage medium having grooves that are concentrically or spirally formed. The present invention also relates to an information recording apparatus for recording information on such a storage medium. The present invention also relates to an information playback apparatus for playing back information from such an information storage medium.

2. Description of the Related Art

Research and development of large-capacity information storage media such as optical disks are recently advancing. An information storage medium has, e.g., tracks that are concentrically or spirally formed. Japanese Patent Nos. 2844638 and 2840631 describe techniques for recording information by displacing a track.

Control information recording by track displacement described in the above prior arts suffers from the problem of low recording density.

BRIEF SUMMARY OF THE INVENTION

It is an object of the present invention to provide an information storage medium in which control information is recorded at high density by track displacement.

In order to solve the above problem and achieve the object, an information storage medium of the present invention has the following arrangement.

According to the present invention, there is provided an information storage medium comprising a wobbled groove whose wobble period is modulated by multi-frequency shift keying corresponding to playback control information, wherein one wavelength of the lowest frequency contained in the multi-frequency shift keying is an integer multiple of a half wavelength of the remaining frequencies contained in the multi-frequency shift keying.

Additional objects and advantages of the present invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

The point of the present invention will be described first.

(1) An information storage medium according to an embodiment of the present invention has a concentrical or spiral groove. The groove radially wobbles. Playback control information is recorded by changing the wobble period. The playback control information contains address data representing which information on the disk is being played back. To modulate the playback control information to the wobble pattern period, multi-frequency shift keying is used. Frequencies contained in the multi-frequency shift keying have an orthogonal relationship. Multi-frequency shift keying here indicates frequency shift keying using three or more frequencies.

Playback control information recording using multi-frequency shift keying is more excellent in its recording efficiency than that using 2-frequency shift keying. Since playback control information can frequently be recorded, a so-called tracking error can be detected at an early stage.

Additionally, when playback control information is carried by multi-frequency shift keying, a filter for a narrower band can be used in multi-frequency shift keying to distinguish the frequencies than in 2-frequency shift keying. For this reason, multi-frequency shift keying can suppress information determination errors due to white noise than 2-frequency shift keying.

(2) The information storage medium according to an embodiment of the present invention has a concentrical or spiral groove. The groove radially wobbles. Playback control information is recorded by changing the wobble period. The playback control information contains address data representing which information on the disk is being played back. To modulate the playback control information to the wobble pattern period, 2-frequency shift keying is used. Frequencies contained in the 2-frequency shift keying have an orthogonal relationship.

When the orthogonal relationships described in (1) and (2) hold, the following relationship is satisfied.

Let T be the transfer period of one symbol. Assume that N-frequency shift keying (N is an integer; N≧2) is executed. Letting f1, f2, ..., fN be the frequencies representing the symbols, arbitrary frequencies fi and fj (i and j are integers; $1 \leq i, j \leq N$) are selected. Let Ai and Aj be arbitrary amplitudes, $\phi i$ and $\phi j$ be arbitrary phase angles, and t be the variable indicating time. Then, the following relationships hold.

$$\int_0^T A_i \cos(2\pi f_i t + \phi_i) \times A_j \cos(2\pi f_j t + \phi_j) dt = 0$$

When delay detection (to be described later) is executed, reception signal processing can be simplified using the orthogonality because the detection output becomes zero at the boundary between frequencies.

An embodiment of the present invention will be described below in detail with reference to the accompanying drawing.

Figure 1:
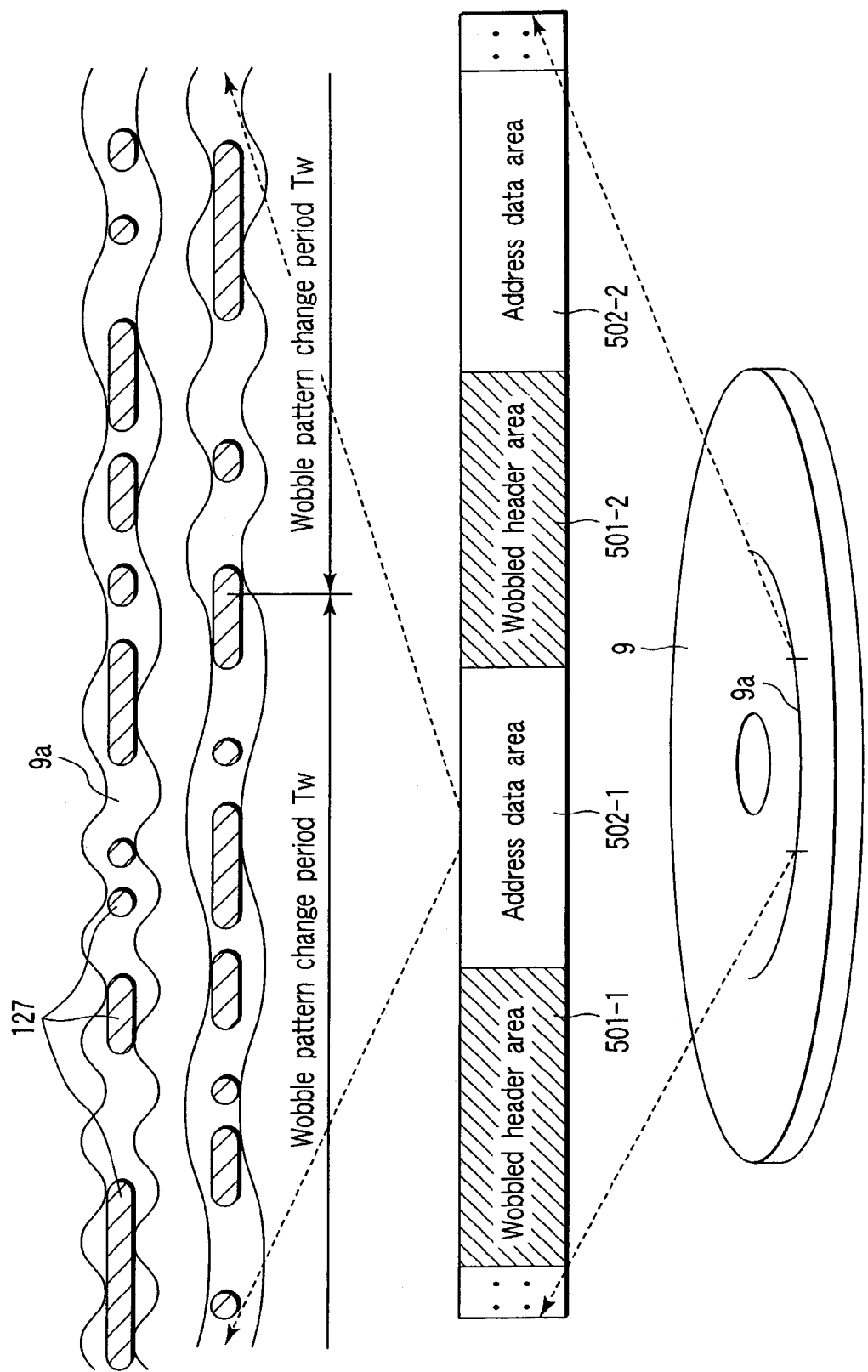
FIG. 1 is a view showing the structure of an information storage medium of the present invention.

FIG. 1 is a view showing the structure of the information storage medium according to the embodiment of the present invention.

A groove 9a is concentrically or spirally formed in an information storage medium 9. A recessed portion of the groove 9a is called a land, and a projecting portion is called a groove. One round along the groove 9a is called a track. User data is recorded along the track. The information is played back by irradiating the information storage medium 9 with a laser beam and reading a change in reflected light intensity caused by a recording mark 127 on the track.

On the other hand, the groove 9a on the information storage medium 9 wobbles in the radial direction. In the present invention, the wobble period changes to record playback control information represented by address data indicating the location of information played back from the disk. This wobble appears as the difference between the wobble amount and the virtual central line of the track in a track difference signal which is observed by an information recording/playback section 41 shown in FIG. 9 to move an optical pickup 702 shown in FIG. 8 along the track direction.

The structure of playback control information is shown in the second column of FIG. 1. The groove 9a has wobbled header areas 501 (501-1, 501-2, ... ) and address data areas 502 (502-1, 502-2, ... ) The wobble pattern is generated by executing orthogonal multi-frequency shift keying for the playback control information.

Orthogonal multi-frequency shift keying (four frequencies) used to modulate the playback control information to obtain the wobble pattern will be described below.

Modulation Index m Between Adjacent Frequencies Time Slot Interval Ts (Time Necessary for Sending One Symbol)

$$1 \leq i \leq 4 \ (i \text{ is an integer}) \qquad (0)$$

$$(F_{i+1} - F_i)T_s = m \qquad (1)$$

$$F_C \equiv \frac{F_2 + F_3}{2} \qquad (2)$$

$$\Delta F \equiv \frac{F_{i+1} - F_i}{2} = \frac{m}{2T_S} \qquad (3)$$

$$F_i = F_C + (2i - 5)\Delta F = F_C + \frac{(2i - 5)m}{2T_S} \qquad (4)$$

When the minimum frequency $F_1$ is arranged at period N/2 (N is an integer) within the time slot interval Ts, the following relationship holds:

$$F_1 = \frac{N}{2T_S} \qquad (5)$$

Equations (4) and (5) can be rewritten to $$F_C = \frac{N + 3m}{2T_s} \qquad (6)$$

$$F_i = \frac{N + (2i - 2)m}{2T_S} \qquad (7)$$

A period $n_i$ in which each $F_i$ present within the time slot interval Ts is given by $$n_i = \frac{F_C}{1 + T_S} = \frac{N}{2} + (i - 1)m \qquad (8)$$

where $F_i$ is the frequency corresponding to each symbol, $F_c$ is the center frequency, and $\Delta F$ is the frequency shift.

In addition, orthogonal frequency modulation that satisfies the above frequency relationship occurs under a condition given by $$\Delta F \cdot T_S = m = \frac{N}{2} \ (N \text{ is an integer}) \qquad (9)$$

Figure 2:
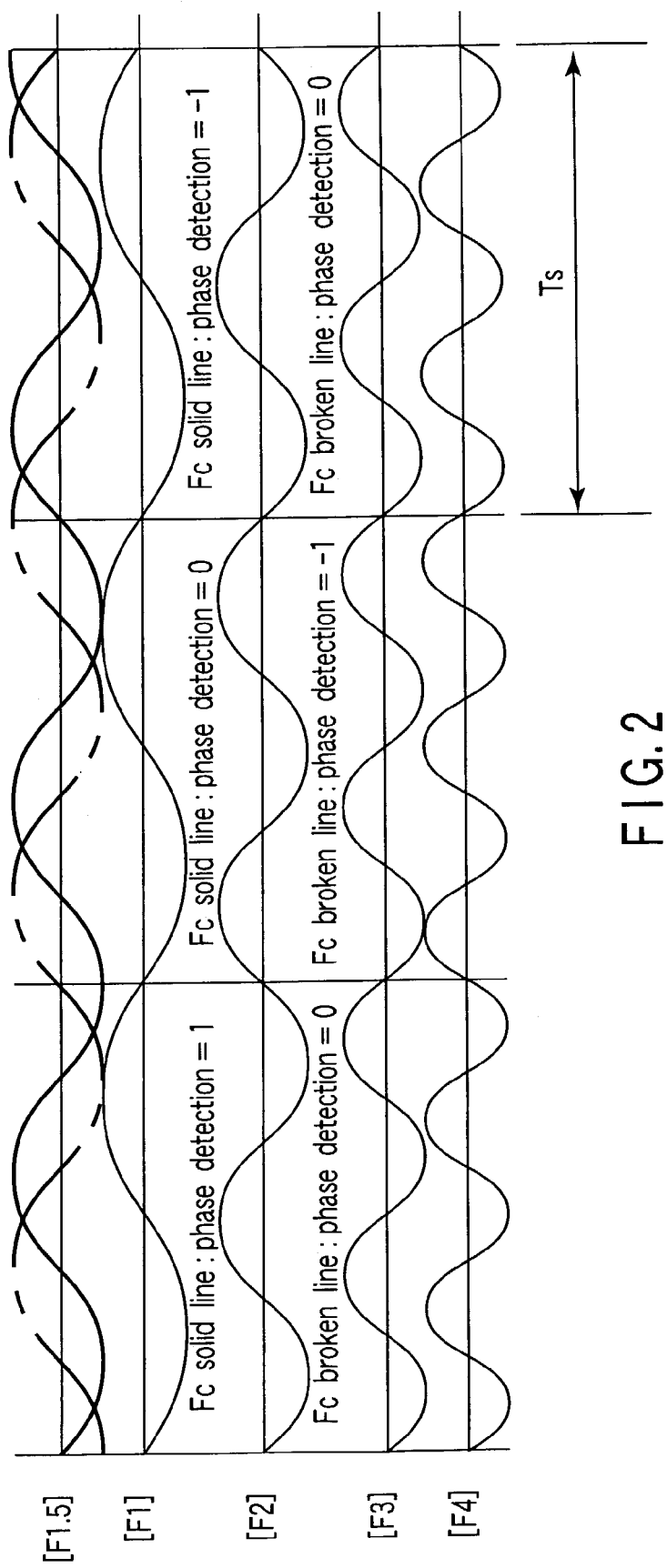
FIG. 2 is a view showing four orthogonal frequencies.
Figure 3:
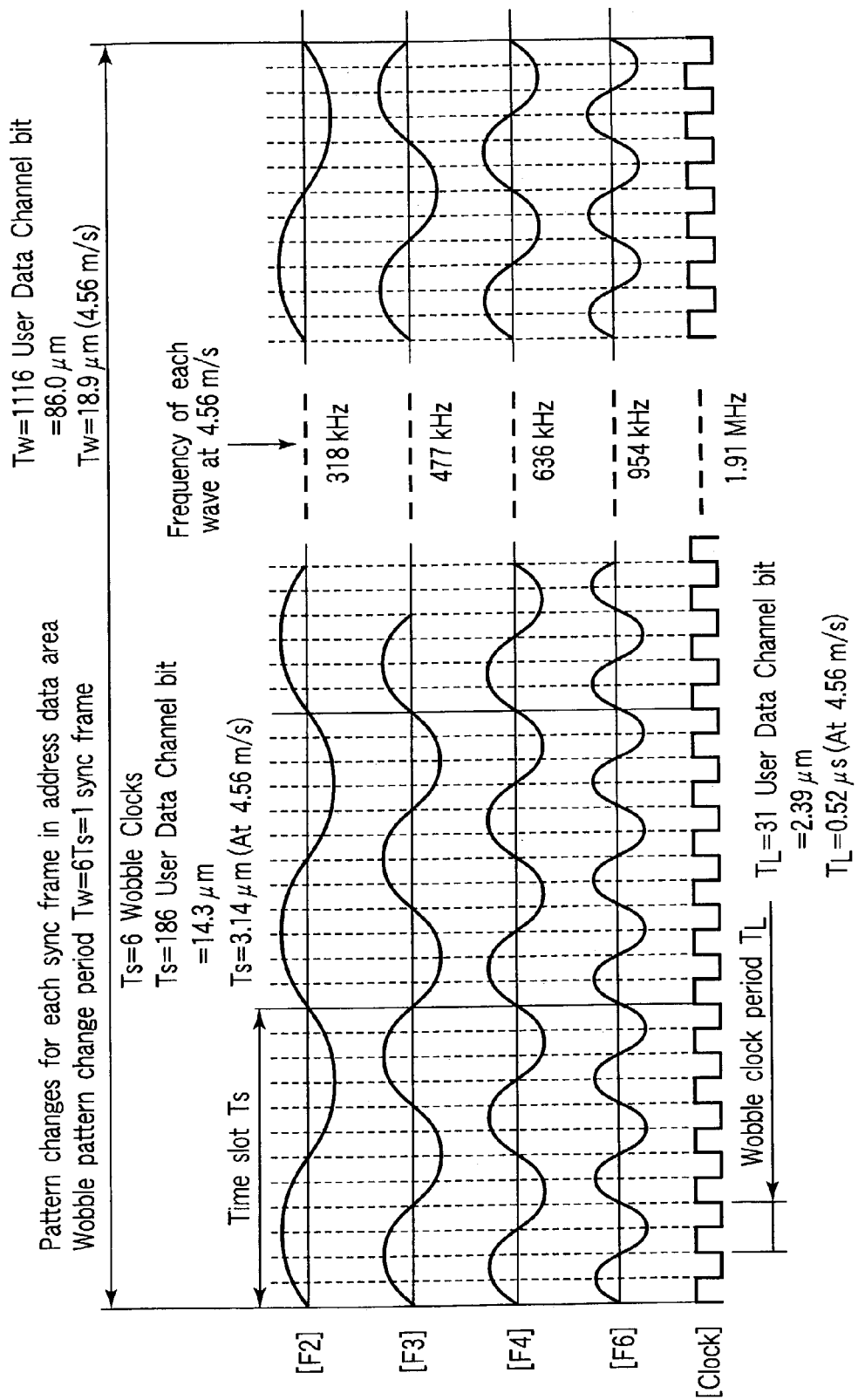
FIG. 3 is a view showing four orthogonal frequencies and a wobble clock.

Orthogonal 4-frequency shift keying indicated by the above equation is applied to the information storage medium of the present invention. One time slot interval Ts is assigned to the length of one period of F1, so m=0.5 and N=2. When m=0.5 and N=2, and binary modulation is executed using only i=1 and i=2, so-called MSK (Minimum Shift Keying) is executed. As shown in FIG. 2, m=0.5 and N=2. The waves satisfy orthogonal conditions within the range of the time slot Ts, FIG. 3 is a view for explaining a wobble pattern on the information storage medium 9 using orthogonal 4-frequency shift keying when the read of the information storage medium 9 is executed at CLV (Constant Linear Velocity). For example, assume that F1 is set at 318 kHz when the linear velocity is 4.56 m/s. Then, the frequencies representing symbols are 318 kHz (F2), 477 kHz (F3), 636 kHz (F4), and 954 kHz (F6) on the basis of the above-described relationship. As the most characteristic feature of the present invention, [F2]:[F3]=2:3, and [F2]:[F4] or [F3]:[F6]=1:2. This makes the length of a time slot Ts common to the four waves in FIG. 3 relatively small and also the relative length of a wobble clock period TL common to the four waves large. As a result, the structure of the demodulation circuit shown in FIG. 11 can be simplified, and the demodulation reliability increases. In the relationship between the frequency and the linear velocity exemplified in FIG. 3, the time slot interval Ts is 3.14 μS, and its length on the disk is 14.3 μm. In addition, one symbol is changed for every 6 Ts, and its length is made match one sync frame length Tw in the DVD format. One symbol or one wobbled word corresponds to the wobble pattern change period Tw. As shown in FIG. 3, in the present invention, since a wobble having four frequencies corresponds to that period, two bits (two wobble bits) correspond to the period by binary expression for one symbol (one wobbled word). When one symbol (one wobbled word) is assigned to each time slot Ts, the recording efficiently is highest. However, problems (1) to (3) are posed.

(1) If even a small physical defect is present in a wobble pattern, a detection error or data shift readily occurs.
(2) The delimiter of each symbol (one wobbled word) Tw is difficult to detect.
(3) The reliability of data detection for each symbol (one wobbled word) Tw is low.

To solve these problems, a plurality of time slots are assigned to one symbol (one wobbled word) to set Tw=LTs (L is an integer). The frequency is constant through a symbol (one wobbled word). Accordingly, since the number of wobbles contained in one symbol (one wobbled word) Tw increases, effects (1) to (3) below are obtained.

(1) A detection error hardly occurs even depending on the physical result in the wobble pattern, and the data detection reliability increases.
(2) When a delay detection circuit 550 is used, the end of each symbol (one wobbled word) can easily be detected.
(3) Accurate detection can be executed using bandpass filter circuits 541 to 544 having a very simple structure.

FIG. 3 shows an example of 4-frequency MSK using four different frequencies. However, the characteristic feature of the present invention can also be applied to a method using two wavelengths. For example, even in a method (2-frequency MSK) using [F2] and [F3] in FIG. 3, when Tw=LTs, the same effects as described above can be obtained.

Usage of the wobble pattern in this embodiment will be described next.

Figure 4:
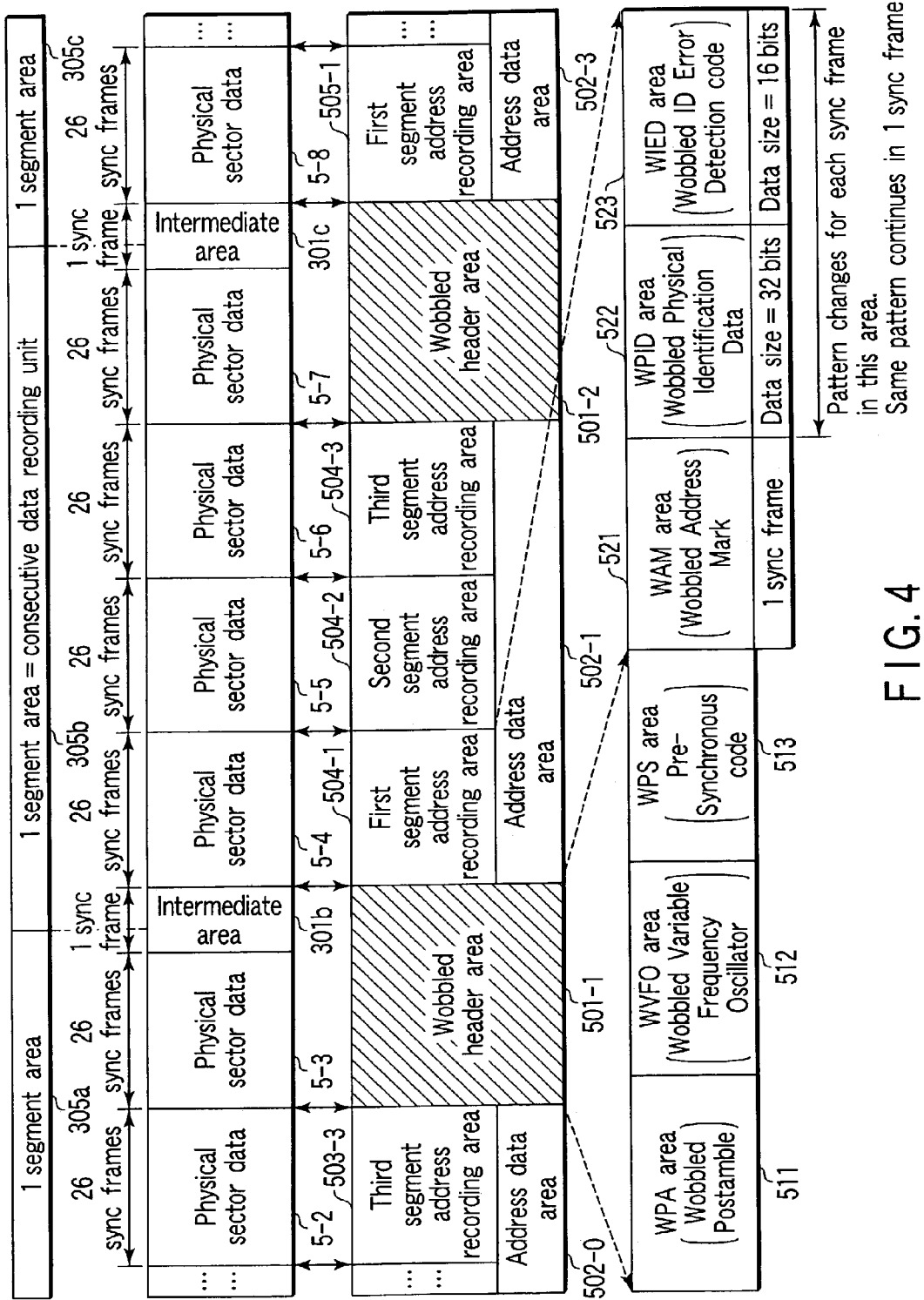
FIG. 4 is a view showing the layout relationship between wobbled data contents and user data.
Figure 5:
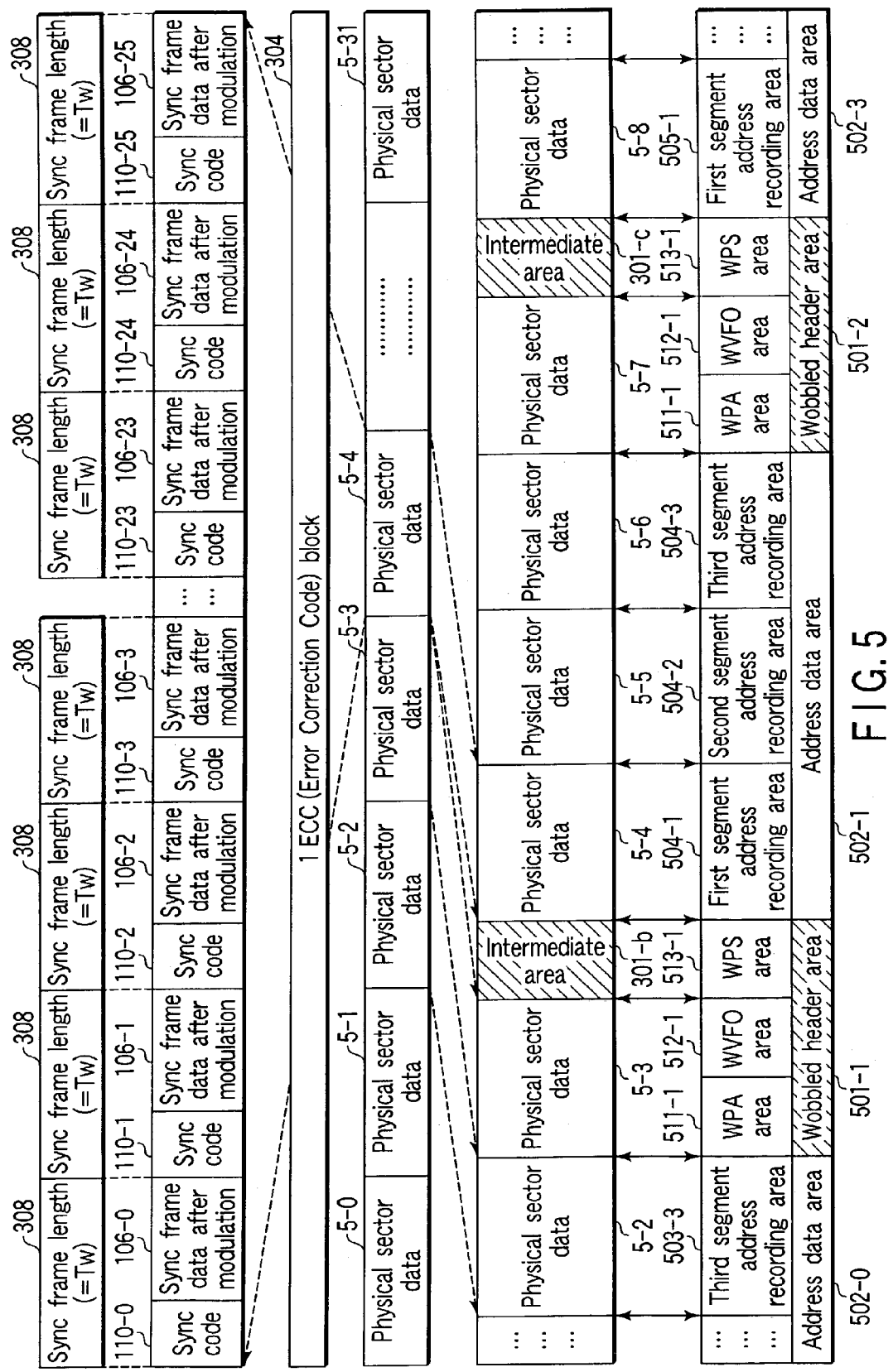
FIG. 5 is a view showing the layout relationship between wobbled data contents and user data, like FIG. 4.

FIG. 4 is a view showing the layout relationship between wobbled data contents and user data. As a characteristic feature, since an address can be determined for each physical sector, the effect of a tracking error detection function in a write mode is very large. FIG. 5 is also a view showing the layout relationship between wobbled data contents and user data. As a characteristic feature, the sync frame length in physical sector data (in user data recording area) matches the wobble pattern change period Tw. As already described above, the information storage medium 9 has the groove 9a that is spirally or concentrically formed. One round along the groove 9a is called a track. Parts formed by dividing the track into some parts are called segments. One segment is the minimum unit in which data is continuously written. FIG. 4 shows a segment 305b on the track and segments 305a and 305c before and after the segment 305b. Especially, the first column of FIG. 4 shows a plurality of consecutive segments. The second column of FIG. 4 shows the structure of user data that is laid out on the wobbled groove 9a and recorded on the disk by a three-dimensional pattern called recording marks or the intensity difference in reflected light. User data in one segment is formed from four consecutive physical sectors and an intermediate area arranged in the gap between the segments.

Although not illustrated, the intermediate area 301 is divided into a postamble area, gap area, VFO (Variable Frequency Oscillator) area, and pre-sync code area. A gap area (not shown) is present between the segment areas 305a and 305b or the segment areas 305b and 305c at the first column in FIG. 4. Rewriting the data on the information storage medium 9 (i.e., rewriting the recording mark 127) is executed for each segment area 305. More specifically, when data in one segment area 305b is to be rewritten, data are recorded at once in the VFO area (located in the intermediate area 301b) at the start position of one segment area 305b, the pre-sync code area, the physical sector data 5-4 to 5-7, and the postamble area located in the intermediate area 301c. The recording start position of the VFO area is located a little after a WPS area 513 (to be described later). The position is slightly shifted in accordance with random phase shift processing (to be described later).

One physical sector has a length of 26 sync frames, like a DVD format. The intermediate area has a length of 1 sync frame. The third column of FIG. 4 shows the structure of wobbled data written in pre-formatting by modulating the wobble. The wobbled data is laid out such that the start and end of each physical sector of the user data match the start and end of a segment address indicating the location of the segment on the disk. When a phase change recording film material is used as a recording layer capable of forming a recording mark on the information storage medium 9, random phase shift processing for slightly shifting the recording start/end position every time a recording mark is rewritten is often performed to increase the number of times of rewrite. In this case, every time the recording mark is rewritten, the start and end positions of each physical sector 5 are slightly shifted from the start and end positions of a corresponding segment address recording position 504.)

The wobbled data is formed from wobbled header areas 501 and address data areas 502. The address data area 502 is formed by recording three identical segment addresses to improve the reliability. The fourth column of FIG. 4 shows the structures of the wobbled header area 501 and address data area 502. Wobbled header area 501-1 or 501-2 is formed from a WPA area 511, WVFO area 512, and WPS area 513. A pattern indicating the start point of the wobbled header is recorded in the WPA area 511. A wobble having a predetermined frequency is recorded in the WVFO area 512. The wobble having a predetermined frequency is used to extract a clock in a playback mode or a reference clock in a recording mode. The WPS area 513 is used for purposes (1) to (3).

(1) The WPS area 513 indicates the end of the wobbled header area 501-1 and also indicates that the address data area 502-1 starts immediately after the wobbled header area 501-1.

(2) The WPS area 513 is used to detect the start position of a WPID area 522 in a first segment address recording area 504-1 that follows the WVFO area 512, WPS area 513, and WAM area 521.

(3) The WPS area 513 is used to detect the start position of one segment area 305b. More specifically, immediately after the WVFO area 512 changes to the WPS area 513, recording of the VFO area is started with a little shift in accordance with the random phase shift.

Address data area 502-0, 502-1, or 502-2 is formed from three segment addresses. Segment addresses 504-1, 504-2, and 504-3 have information with identical contents. Each segment address is formed from a WAM area 521 representing the start of address information, a WPID area 522 serving as the address information, and a WIED area 523 serving as the error correction information of the address information. When three segment addresses are recorded, the reliability of the address information can be increased because even when a segment address cannot be read due to a defect on the information storage medium 9, another segment address can be read.

Figure 6:
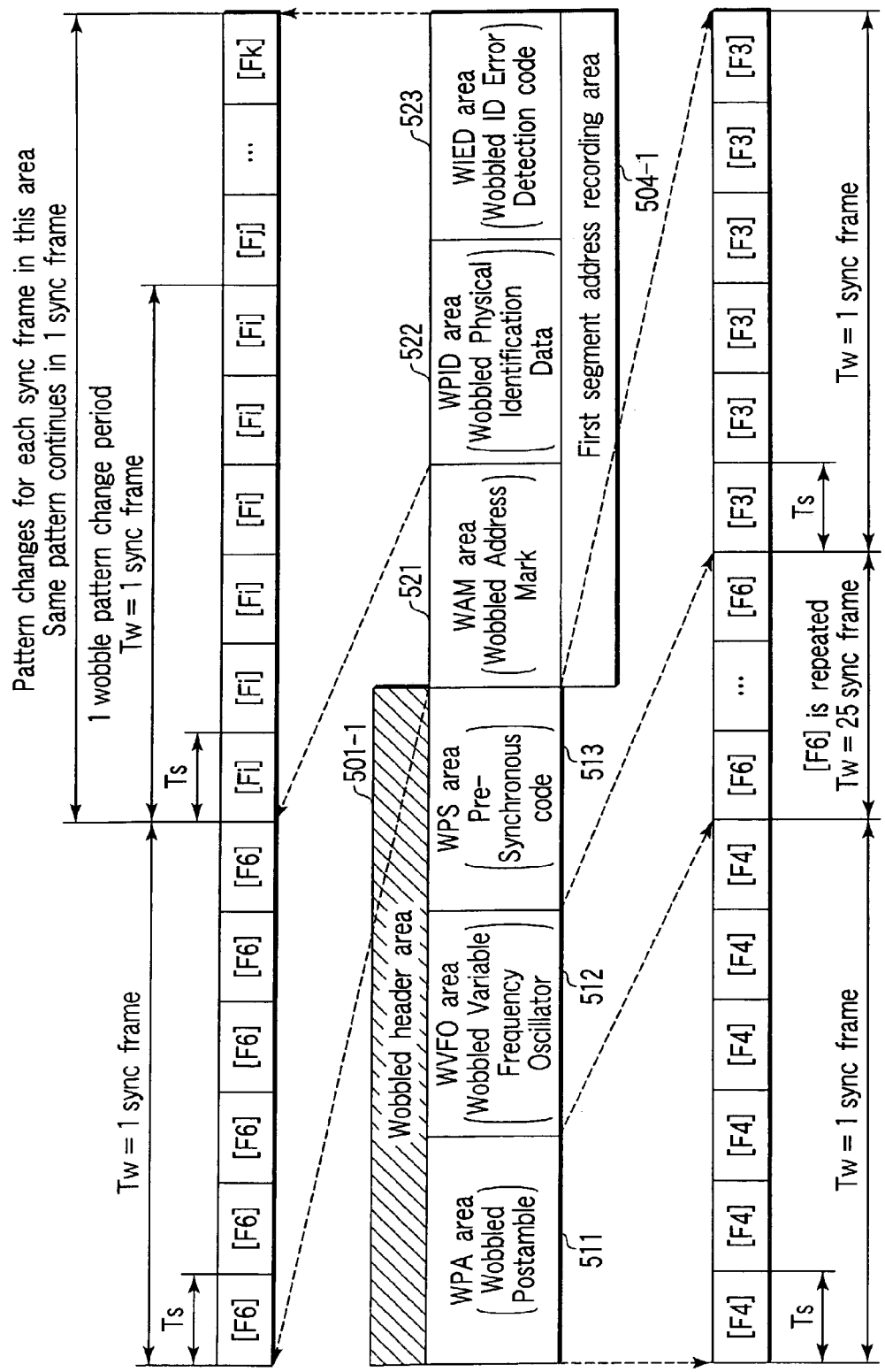
FIG. 6 is a view showing a wobble pattern in each area.

FIG. 6 is a view showing the wobble pattern in each area. As a characteristic feature, the wobble pattern has a predetermined frequency in one symbol (one wobbled word) period Tw, and, in any pattern, the frequency changes only at the turn of one wobble pattern change period Tw. The delay detection output is 0 at the boundary between the areas and is always 1 in each area.

The second column of FIG. 6 is the same as the fourth column of FIG. 4. As shown in the third column of FIG. 6, in the WPA area 511, the F4 pattern is repeated for one sync frame. In the WVFO area 512, the F6 pattern is repeated for 25 sync frames. In the WPS area 513, F3 is repeated for one sync frame. As shown in the first column of FIG. 6, the WAM area 521 has the F6 patterns for one sync frame. The WPID area 522 has a pattern in which one of the F2 to F6 patterns obtained by encoding address data changes for each sync frame, i.e., for each symbol (each wobbled word) period Tw. The WIED area 523 also has a pattern in which one of the F2 to F6 patterns corresponding to the error correction code changes for each sync frame.

Figure 7:
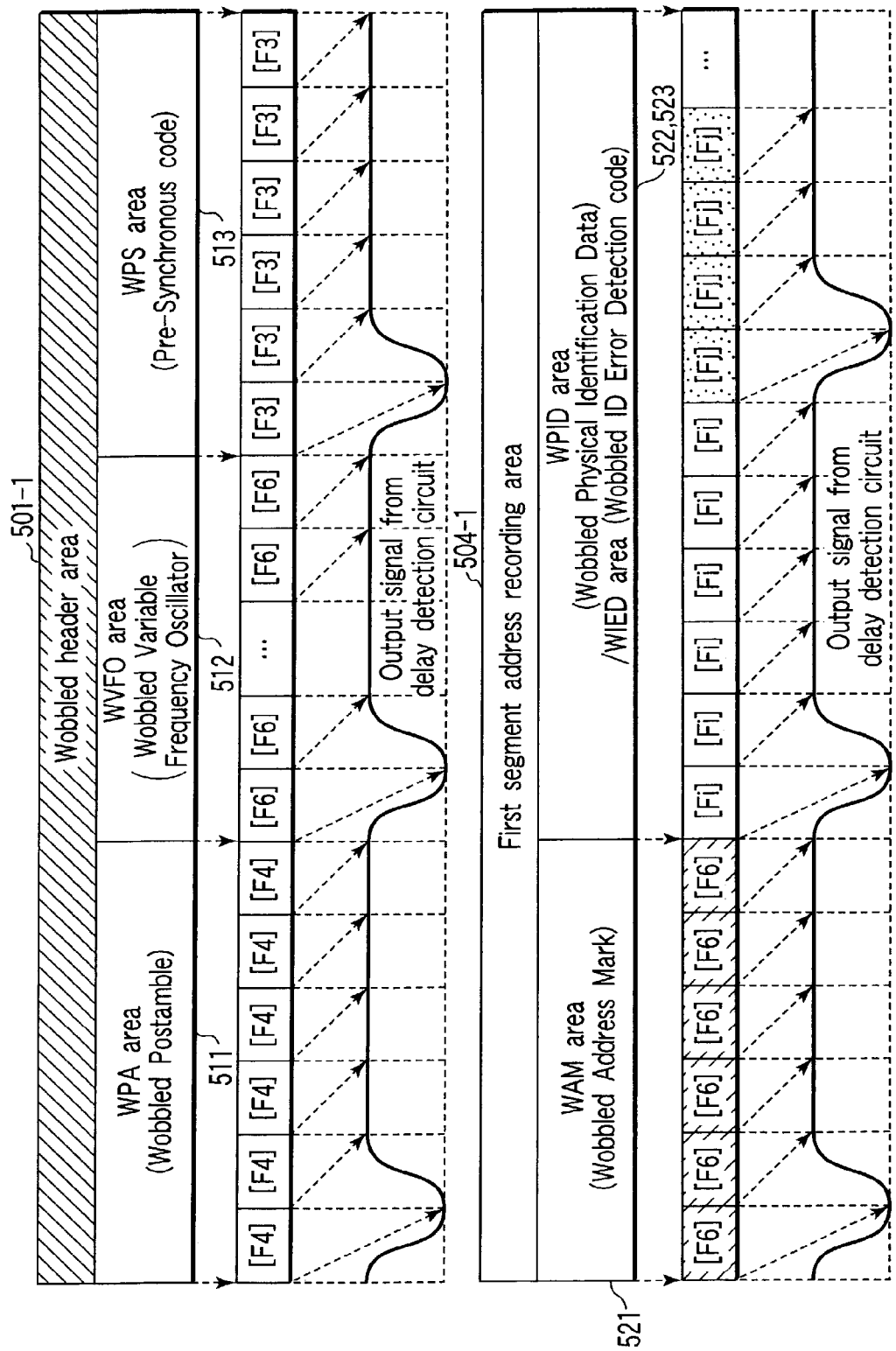
FIG. 7 is a view showing the relationship between the wobbled data and the delay detection circuit output signal.

As described above, the four frequency patterns F2 to F6 have an orthogonal relationship. For this reason, the end of data for each sync frame can easily be detected by using a delay detection circuit 550, as shown in FIG. 7. More specifically, when one symbol (one wobbled word) period Tw serving as the switching unit of frequencies and the time slot Ts satisfy Tw=LTs, and frequencies having an orthogonal relationship are selected, the boundary between symbols (wobbled words) can be detected by the delay detection circuit 550.

Letting s(t) be the input, the delay detection output is given by $$\int_0^T s(t) \cdot s(t - T_S) \qquad (10)$$

The first column of FIG. 7 corresponds to the second column of FIG. 6. The second column of FIG. 7 corresponds to the combination of the first and third columns of FIG. 6. The third column of FIG. 7 shows the outline of the output signal when delay detection is performed for the signal shown in the second column of FIG. 7. As a characteristic feature, for the wobbled data structure shown in FIG. 6, in any pattern, the frequency changes only at the turn of one wobble pattern change period Tw. As a result, the delay detection output is 0 at the boundary between the areas and is always 1 in each area.

As described above, the delay detection output changes to 0 when the frequency pattern changes. This is because the four frequencies representing symbols have an orthogonal relationship. In the address data area 502-0, 502-1, or 502-2, encoding is executed such that a change in wobble pattern indicating information always occurs for every sync frame. Then, the end of one sync frame is output to the delay detection result, and the demodulation timing can easily be generated. In addition, encoding is also executed to make the average frequency of the wobbled signal constant for processing to be described later.

Figure 8:
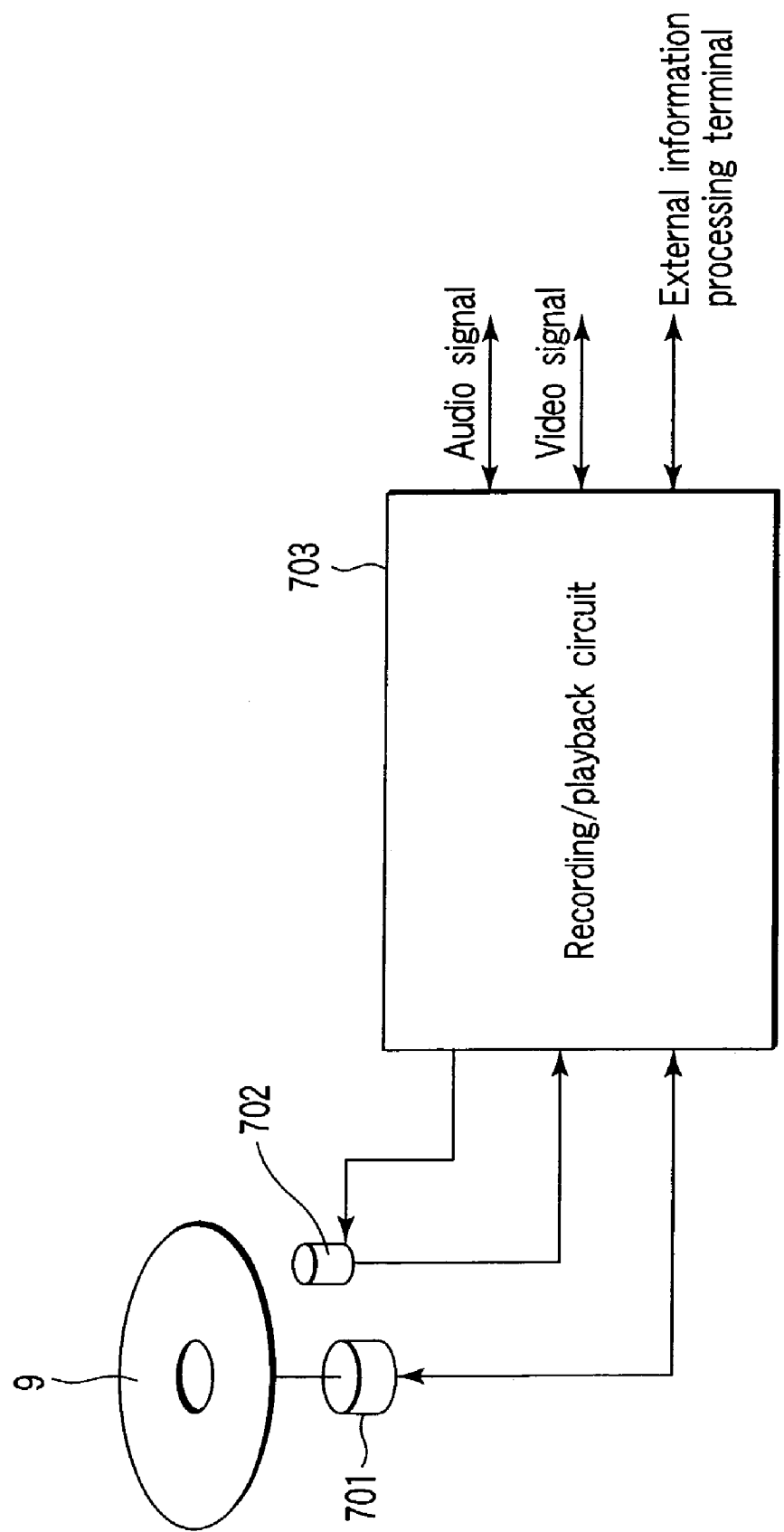
FIG. 8 is a view showing the schematic arrangement of an information recording/playback apparatus according to an embodiment of the present invention.

FIG. 8 is a view showing the schematic arrangement of an information recording/playback apparatus according to an embodiment of the present invention. This information recording/playback apparatus records new information or rewrites information (including erase of information) at a predetermined position on the information storage medium 9 (optical disk) using a focused spot, or plays back already recorded information from a predetermined position on the information storage medium 9 (optical disk) using a focused spot.

Referring to FIG. 8, a spindle motor 701 is controlled by a recording/playback circuit 703 to rotationally drive the information storage medium 9 (optical disk). The optical pickup 702 is focus- and tracking-controlled by the recording/playback circuit 703 to focus light at a predetermined position on the information storage medium 9 (optical disk). In the playback mode, a playback signal detected by the optical pickup 702 is input to the recording/playback circuit 703. The recording/playback circuit 703 demodulates or decodes the playback signal to play back information. At this time, wobbled data is also demodulated and used to control playback. In the recording mode, modulation or encoding is executed by a data input/output circuit and recording/playback circuit 703. The signal output from the recording/playback circuit 703 is sent to the optical pickup 702. The optical pickup 702 irradiates the information storage medium 9 (optical disk) with a laser beam to record information. Even during recording, the wobbled data is demodulated and used to control recording.

The above-described information recording/playback apparatus records information on the information storage medium 9 having the groove 9a whose wobble period is modulated by multi-frequency shift keying corresponding to playback control information. More specifically, the recording/playback circuit 703 reads playback control information from the wobble period of the groove 9a and records target information at a target position on the basis of the read playback control information.

Additionally, the above-described information recording/playback apparatus plays back information from the information storage medium 9 having the groove 9a whose wobble period is modulated by multi-frequency shift keying corresponding to playback control information. More specifically, the recording/playback circuit 703 reads playback control information from the wobble period of the groove 9a and plays back target information from a target position on the basis of the read playback control information.

Figure 9:
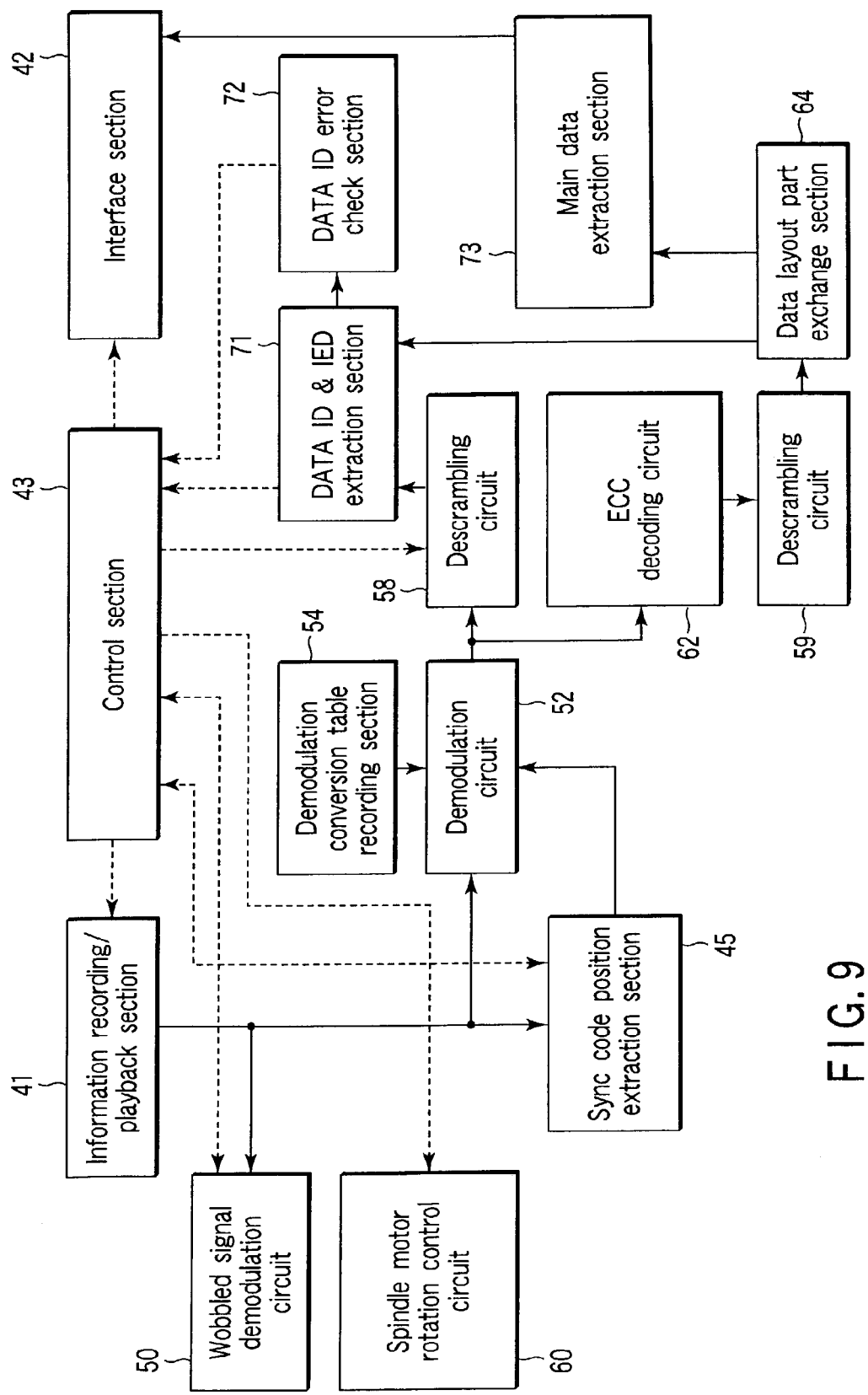
FIG. 9 is a block diagram showing the internal arrangement of a portion related to the playback system of a recording/playback circuit.

FIG. 9 is a block diagram showing the internal arrangement of a portion related to the playback system of the recording/playback circuit 703.

The signal from the optical pickup 702 is input to the information recording/playback section 41. The signal processed by the information recording/playback section 41 is sent to a wobbled signal demodulation circuit 50, sync code position extraction section 45, and demodulation circuit 52. The rotational speed of the information storage medium 9 is known from the wobbled signal demodulation circuit 50, and a spindle motor rotation control circuit 60 is controlled. The sync code position extraction section 45 extracts the sync code position from the wobbled signal and detects the information read start position or the like. The demodulation circuit 52 executes demodulation using the signal from the information recording/playback section 41, the information from the sync code position extraction section 45, and a result from a demodulation conversion table recording section 54. The demodulated signal passes through a descrambling circuit 58. A DATA ID & IED extraction section 71 extracts the DATA ID and IED, and a DATA ID error check section 72 executes error correction. These results are sent to a control section 43 and used to systematically control the playback system. On the other hand, the signal sent from the demodulation circuit 52 to an ECC decoding circuit 62 is subjected to error correction by the ECC decoding circuit 62, passes through a descrambling circuit 59 and data layout part exchange section 64, and is re-synthesized by a main data extraction section 73. Thus obtained information is output to an external device through an interface section 42.

Figure 10:
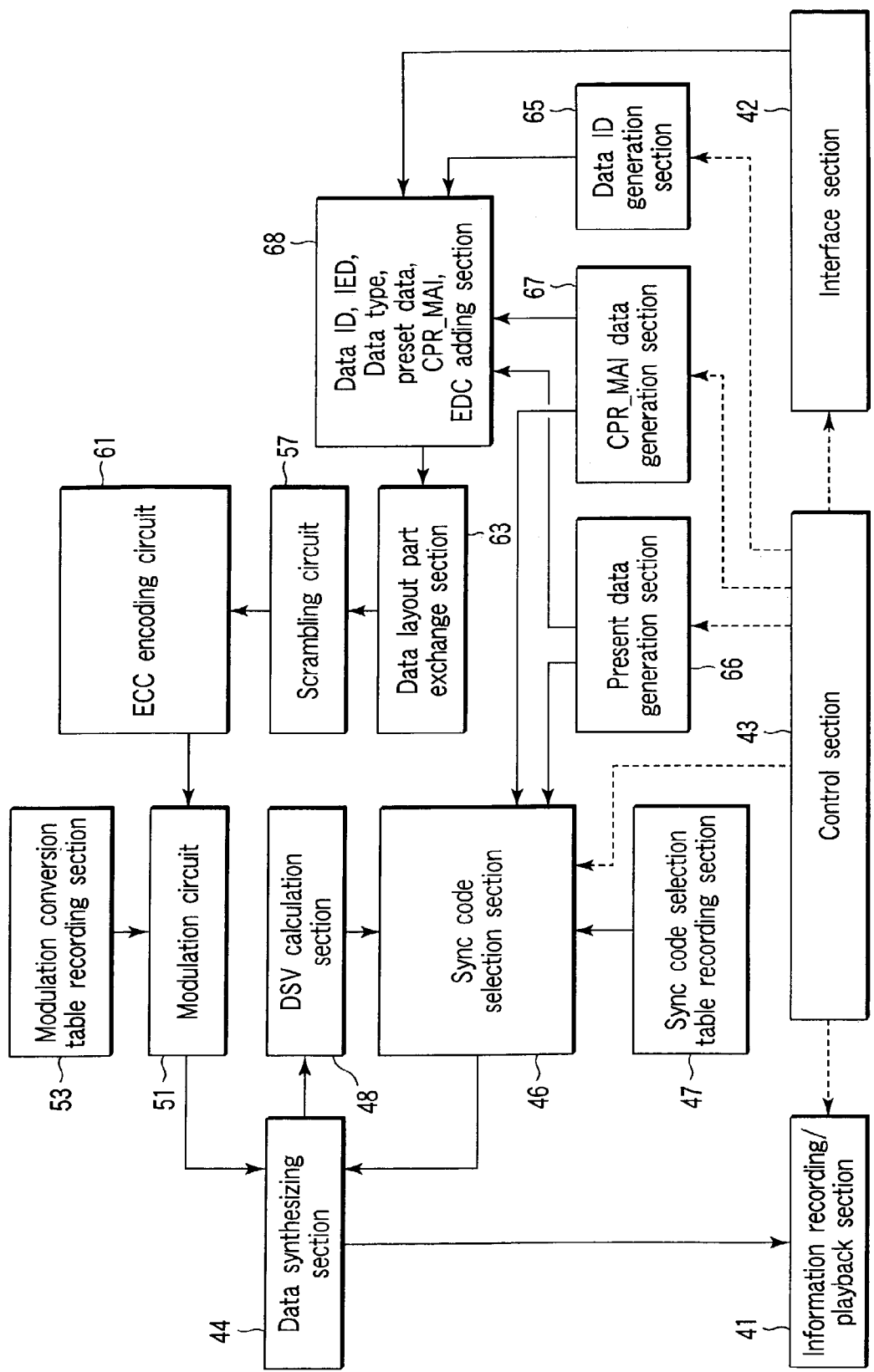
FIG. 10 is a block diagram showing the internal arrangement of a portion related to the recording system of the recording/playback circuit.

FIG. 10 is a block diagram showing the internal arrangement of a portion related to the recording system of the recording/playback circuit 703.

Information input from an external device is input to the interface section 42. The signal flow is reversed to that in the playback system, and a data ID and the like are added to the signal. The signal is input to a data synthesizing section 44 through a data layout part exchange section 63, scrambling circuit 57, ECC encoding circuit 61, and modulation circuit 51. To prevent a DC component from remaining in the recording data, a sync code is generated by a sync code selection section 46 on the basis of the result from a DSV calculation section 48 and added to the recording data. The output from the data synthesizing section 44 is sent to the information recording/playback section 41 and recorded by the optical pickup 702 onto the information storage medium 9. The control section 43 controls the series of operations.

Figure 11:
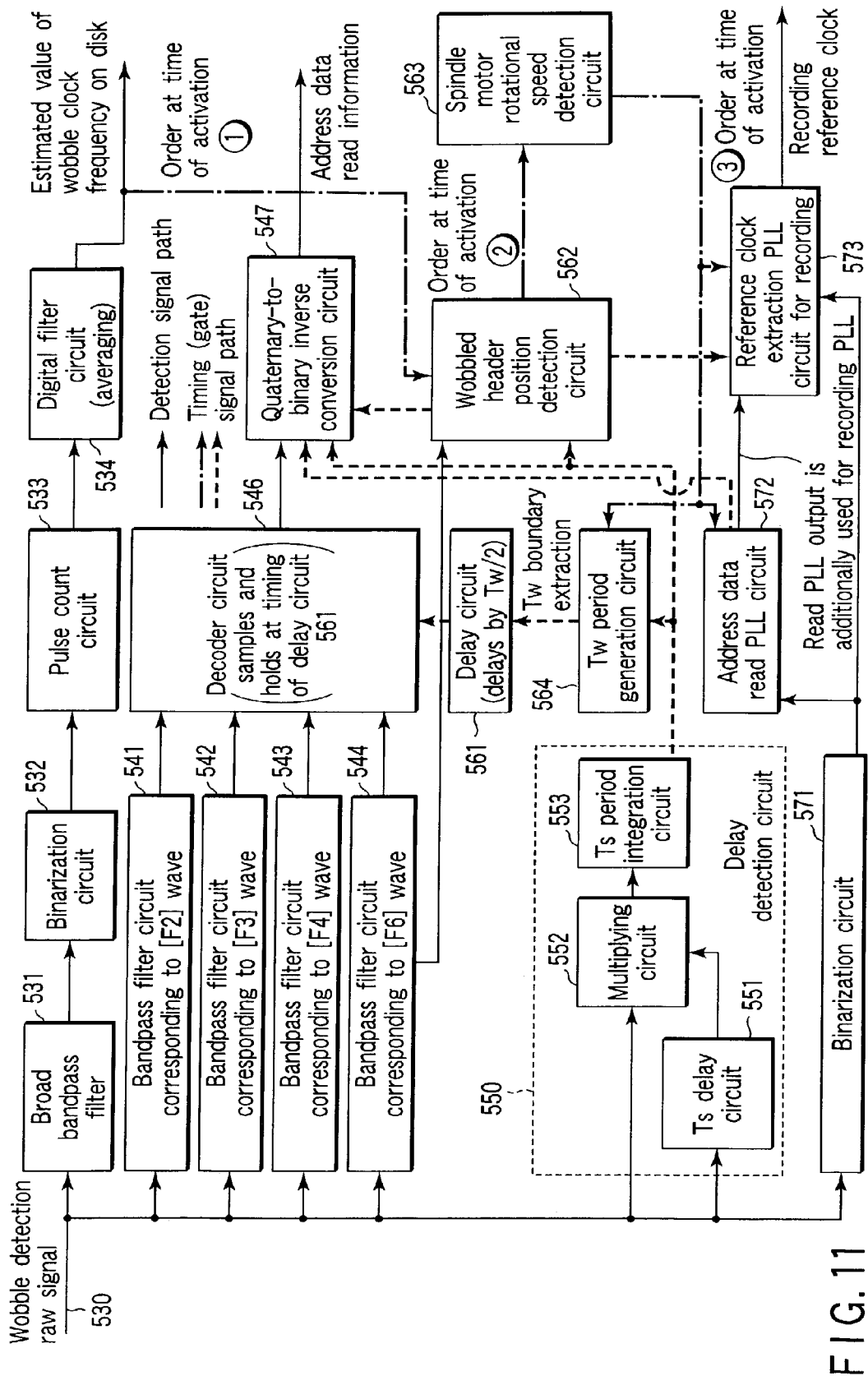
FIG. 11 is a block diagram showing the schematic arrangement of a wobble signal demodulation circuit.
Figure 12:
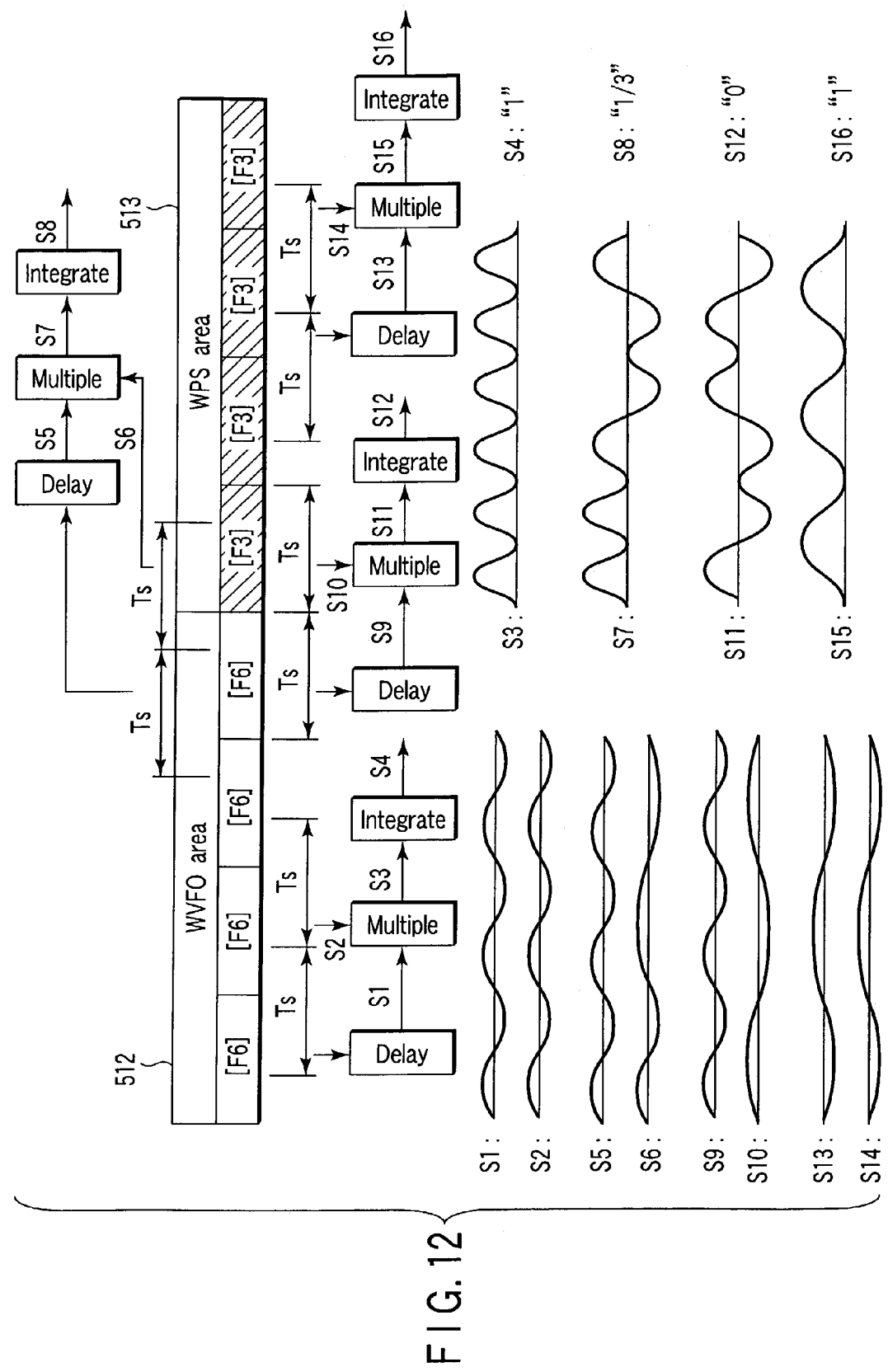
FIG. 12 is a view for explaining the calculation mechanism of a delay detection circuit in the wobble signal demodulation circuit.

FIG. 11 is a block diagram showing the schematic arrangement of the wobble signal demodulation circuit. FIG. 12 is a view for explaining the calculation mechanism of a delay detection circuit in the wobble signal demodulation circuit.

A wobbled signal is used not only to extract address data but also to detect the rotational speed of the spindle motor or generate a recording reference clock. The input wobbled signal undergoes four processes roughly classified, and target information is extracted. As the first process, a signal near the frequency band of the wobbled signal is extracted by a broad bandpass filter 531 and binarized by a binarization circuit. The number of pulses obtained as the result of binarization is counted by a pulse count circuit 533. The signal is averaged through a digital filter circuit 534 to obtain the average value of the frequencies of the wobbled signal. At this time, the above-described encoding that makes the average frequency constant is significant. If it is defined in advance that the average frequency is constant, the rotational speed of the spindle motor can be known from the observed average frequency at the time of, e.g., activation when the demodulation circuit is not yet in synchronization. As the second process, bandpass filters corresponding to the four frequencies are used. Since the frequency contained in the wobbled signal can be extracted, the filter output is input to a decoder circuit 546, and detection and demodulation are executed. At this time, the signal is sampled and held using one sync frame timing extracted by a delay detection circuit 550 (to be described next). The signal output from the decoder circuit 546 becomes address data through a quaternary-to-binary conversion circuit. As the third process, the delay detection circuit 550 is used. The delay detection circuit 550 is a circuit realized from equation (10). The output from the delay detection circuit 550 indicates the end of one sync frame, as shown in the sixth column (lowest column) of FIG. 7. The delay detection circuit 550 outputs the signal as shown in the sixth column (lowest column) of FIG. 7 by the calculation mechanism shown in FIG. 12. As already described above, the end of each sync frame is input to the decoder circuit 546, wobbled header position detection circuit 562, and spindle motor rotational speed detection circuit 563 as a timing signal. As the fourth process, the wobbled signal is directly input to a binarization circuit 571. The binarized signal is input to an address data read PLL circuit 572 and reference clock extraction PLL circuit 573 for recording and used to generate timing signals.

Finally, the flow of processing executed by the control section 43 will be described.

Figure 13:
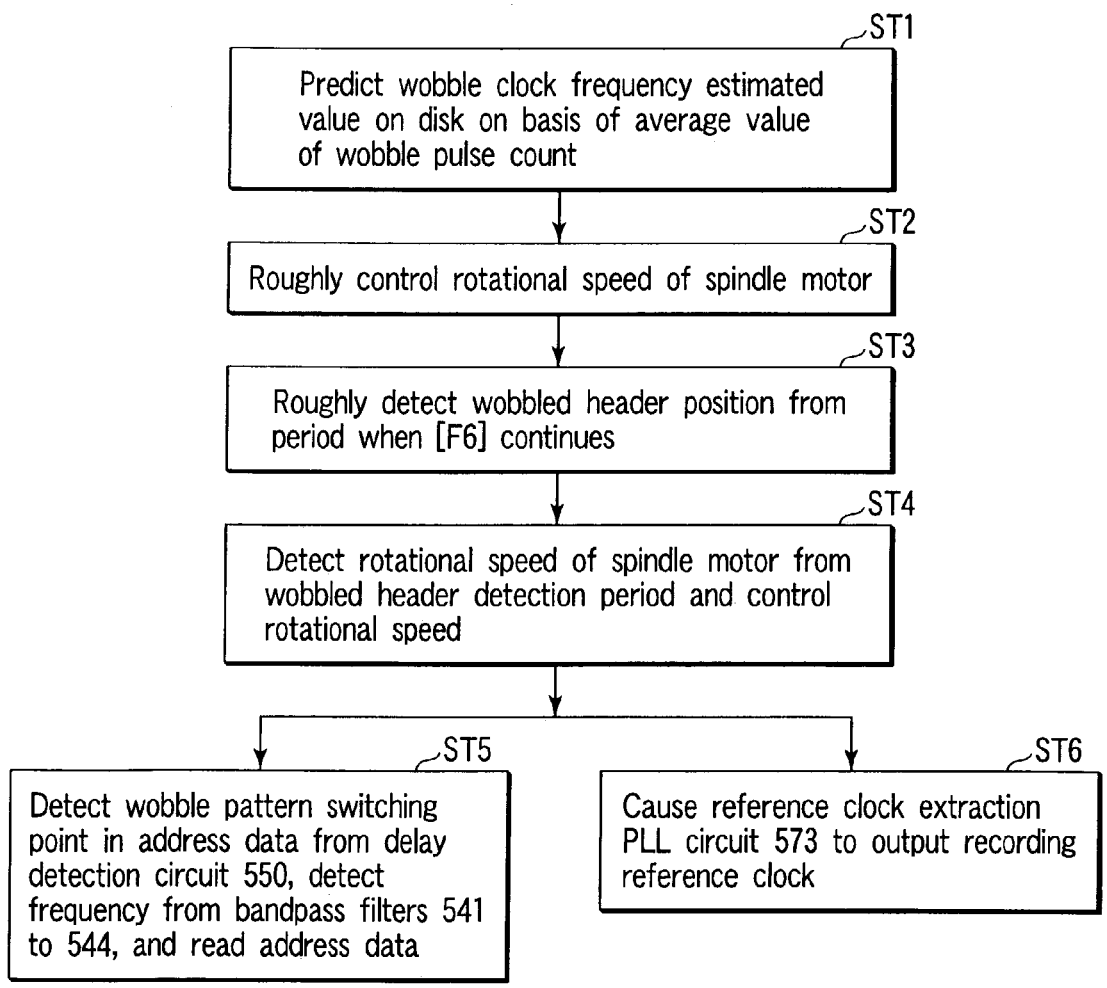
FIG. 13 is a flowchart for explaining operation until the start of operation of the demodulation circuit.

FIG. 13 is a flowchart for explaining operation until the start of operation of the demodulation circuit. Immediately after access to the information storage medium 9 on which address data is recorded in the CLV recording state, the rotational speed of the spindle motor does not match the required rotational speed. Hence, the wobble clock frequency deviates from the ideal state. A wobble detection raw signal 530 is binarized. The average value of the switching interval (output from the digital filter circuit 534) is calculated. A signal rate information estimated value immediately after the access is calculated (ST1). The rotational speed of the spindle motor is approximately predicted from the value and roughly controlled (ST2). A portion where F6 is continuously detected for a long time is detected from the output from a bandpass filter circuit 544 corresponding to the F6 wave to determine the wobbled header position (ST3). The accurate position of the wobbled header 501 is detected also using the output from the delay detection circuit 550. The rotational speed of the spindle motor is detected from the appearance start phase and controlled (ST4). The wobble pattern switching point in address data is detected from the delay detection circuit 550. A frequency is detected from the bandpass filters 541 to 544, and the address data is read (ST5). Simultaneously, a recording reference clock is output from the reference clock extraction PLL circuit 573 (ST6).

Figure 14:
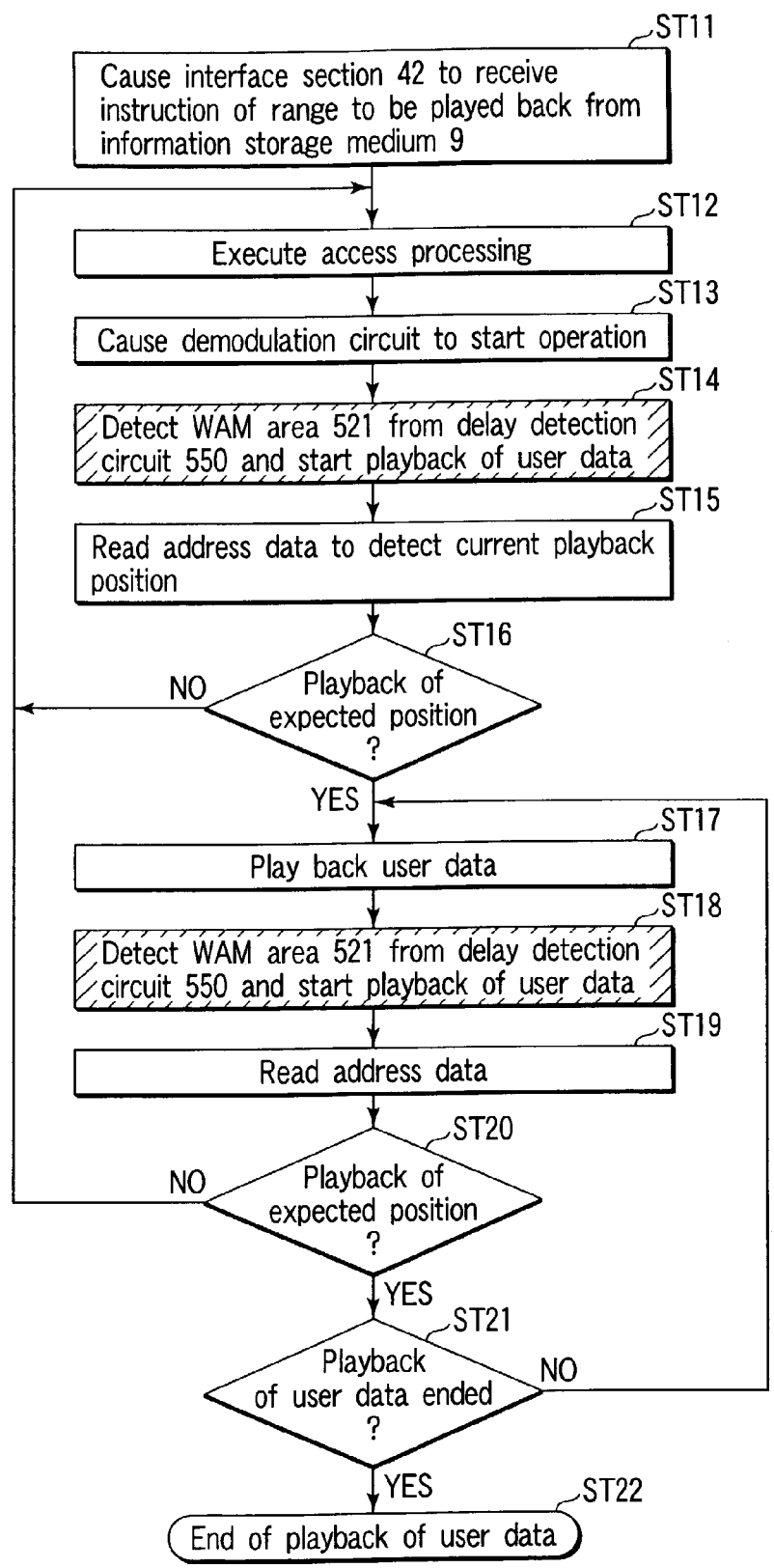
FIG. 14 is a flowchart showing an access/playback control method.

FIG. 14 is a flowchart showing an access/playback control method.

First, the interface section 42 receives an instruction of a range to be played back (ST11). Access processing is executed (ST12). The demodulation circuit is caused to start operating by the method shown in FIG. 13 (ST13). The WAM area 521 is detected from the delay detection circuit 550. A Tw synchronization generation circuit 564 executes flywheel interpolation of the Tw detection period such that the Tw boundary signal is generated even when detection of the delay detection circuit 550 has an omission. In this way, playback of user data is started (ST14). Address data is read to detect the current playback position (ST15). As described above, since three pieces of address information are contained in one segment, the address is determined under the majority rule for the read address. The read address is compared with the address of the position to be played back. If the addresses are different (NO in ST16), access processing is executed again (ST12). If the expected position is being played back (YES in ST16), playback of the user data is continued (ST17). In addition, the WAM area 521 is detected from the delay detection circuit 550, and playback of user data is started (ST18). Address data is read (ST19) to confirm whether the expected position is being played back (ST20). If the expected position is not being played back (NO in ST20), access processing is executed again (ST12). As far as the address to be played back matches the read address (YES in ST20), playback of user data and read/comparison of address data are repeated until playback of the user data is ended (ST17 to ST21).

Figure 15:
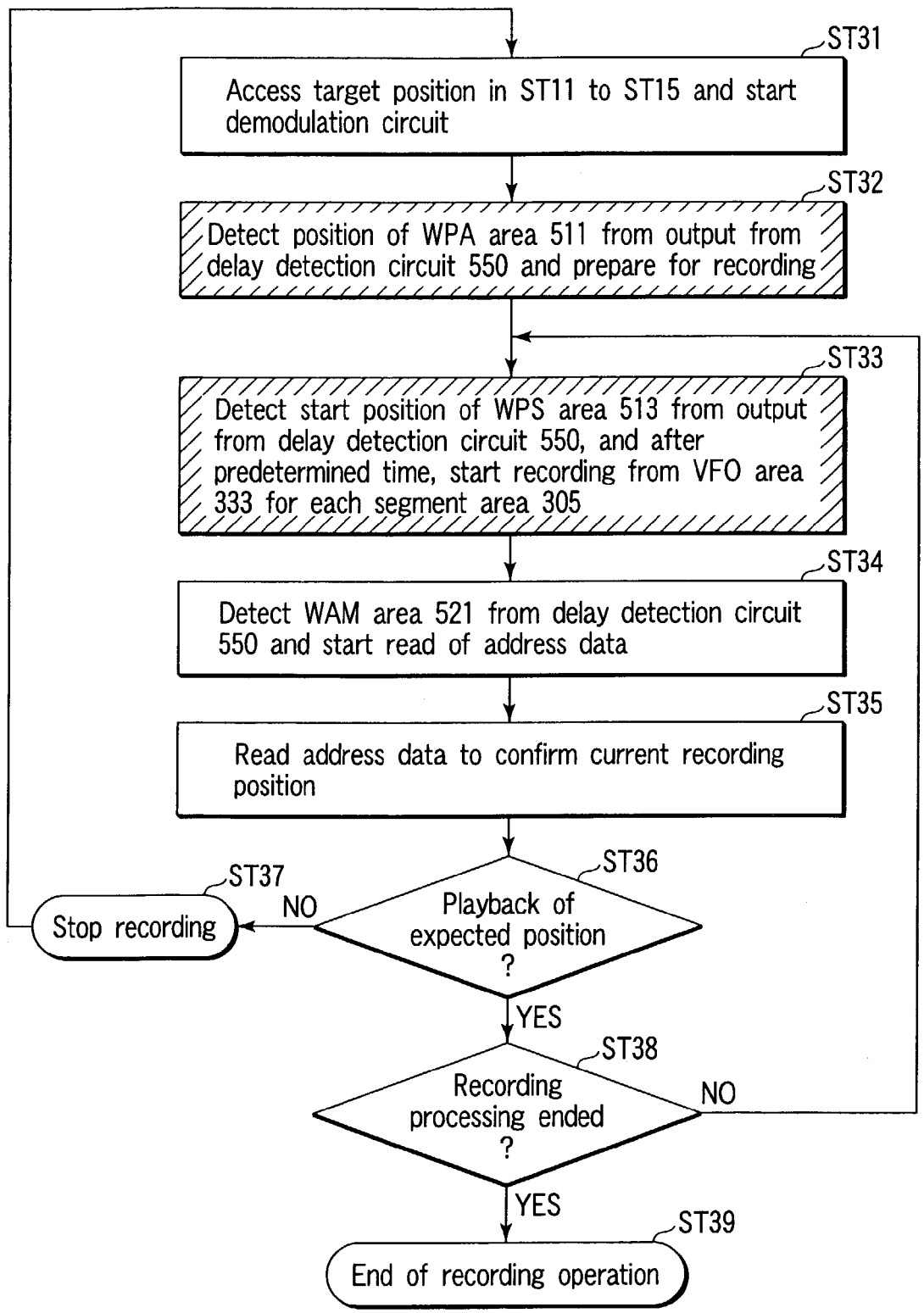
FIG. 15 is a flowchart showing a recording control method.

FIG. 15 is a flowchart showing a recording control method.

The target position is accessed by the method in steps ST11 to ST15, and the demodulation circuit is started (ST31). The position of the WPA area 511 is detected from the output from the delay detection circuit 550, and preparation for recording is done (ST32). The start position of the WPS area 513 is detected from the output from the delay detection circuit 550. After a predetermined time, recording of each segment area 305 is started from a VFO area (ST33). The WAM area 521 is detected from the delay detection circuit 550, and the read of address data is started (ST34). The address data is read to confirm the current recording position (ST35). It is confirmed whether the expected position is being played back (ST36). If even one of the three readable addresses is different from the current address (NO in ST36), recording is stopped (ST37). Detection/recording of the recording start position and detection/comparison of the address data are repeated until recording is ended (ST33 to ST38).

Figure 16:
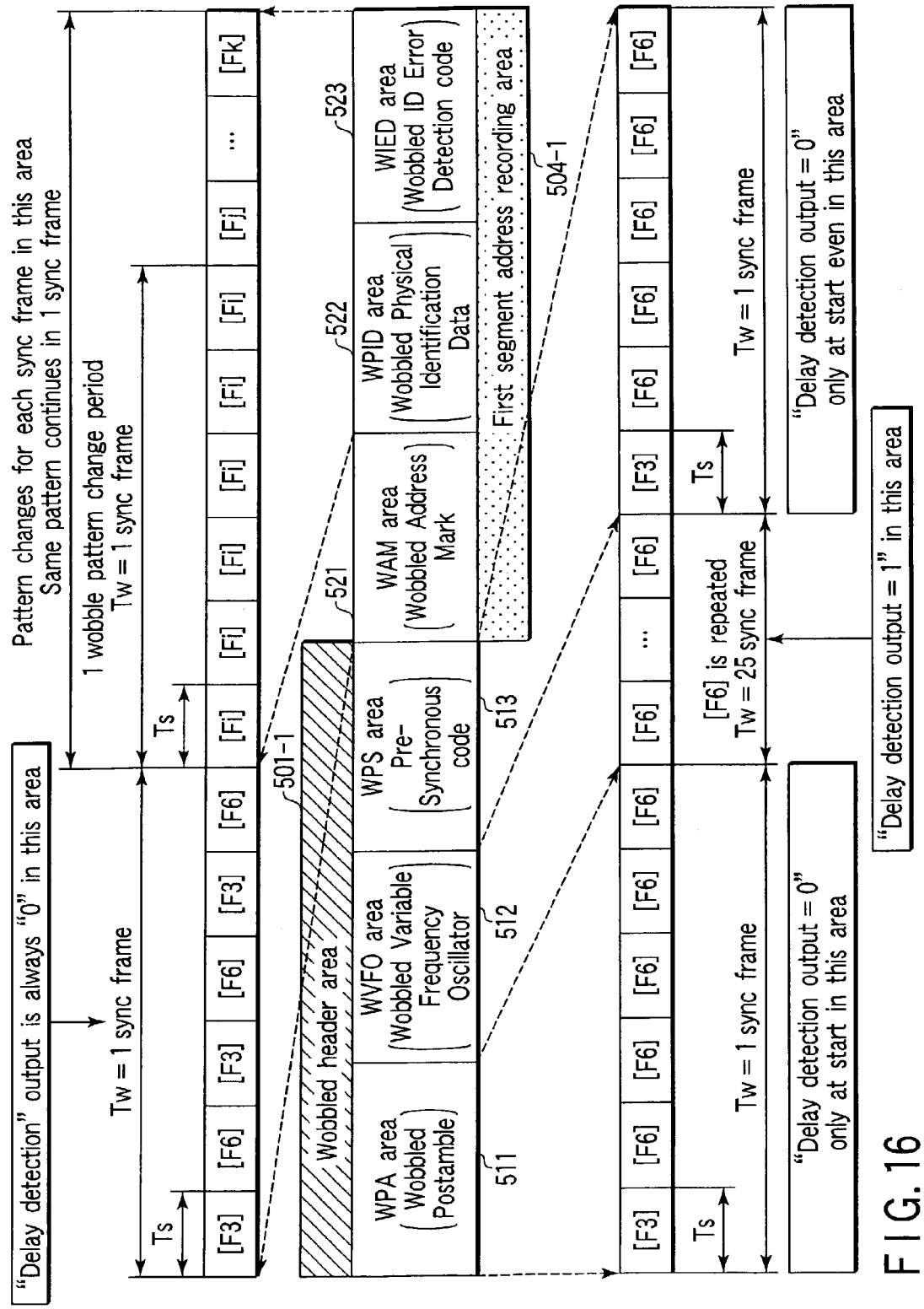
FIG. 16 is a view showing a modification of the wobble pattern shown in FIG. 6.
Figure 17:
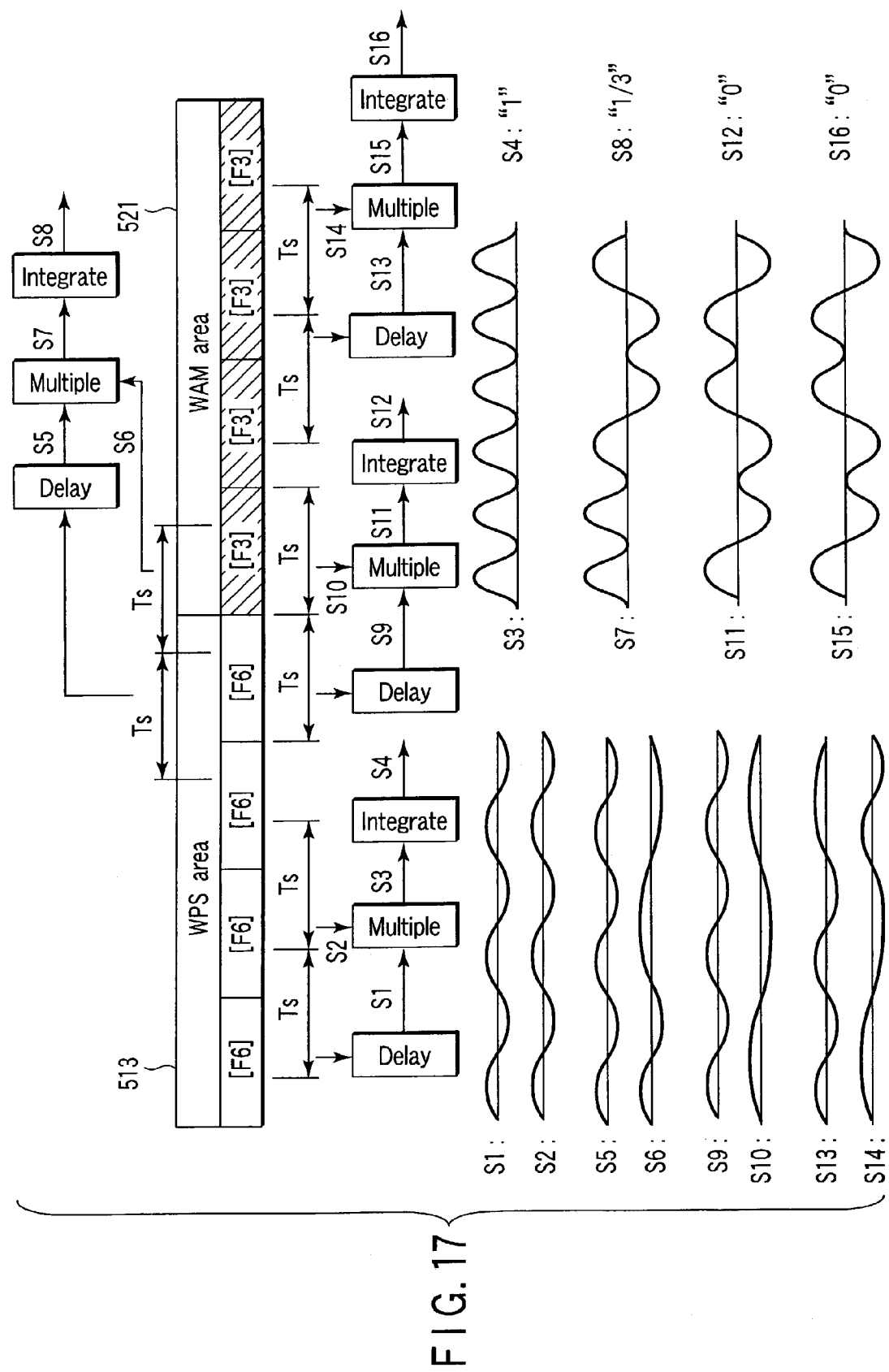
FIG. 17 is a view for explaining the calculation mechanism in the delay detection circuit corresponding to the wobble pattern shown in FIG. 16.
Figure 18:
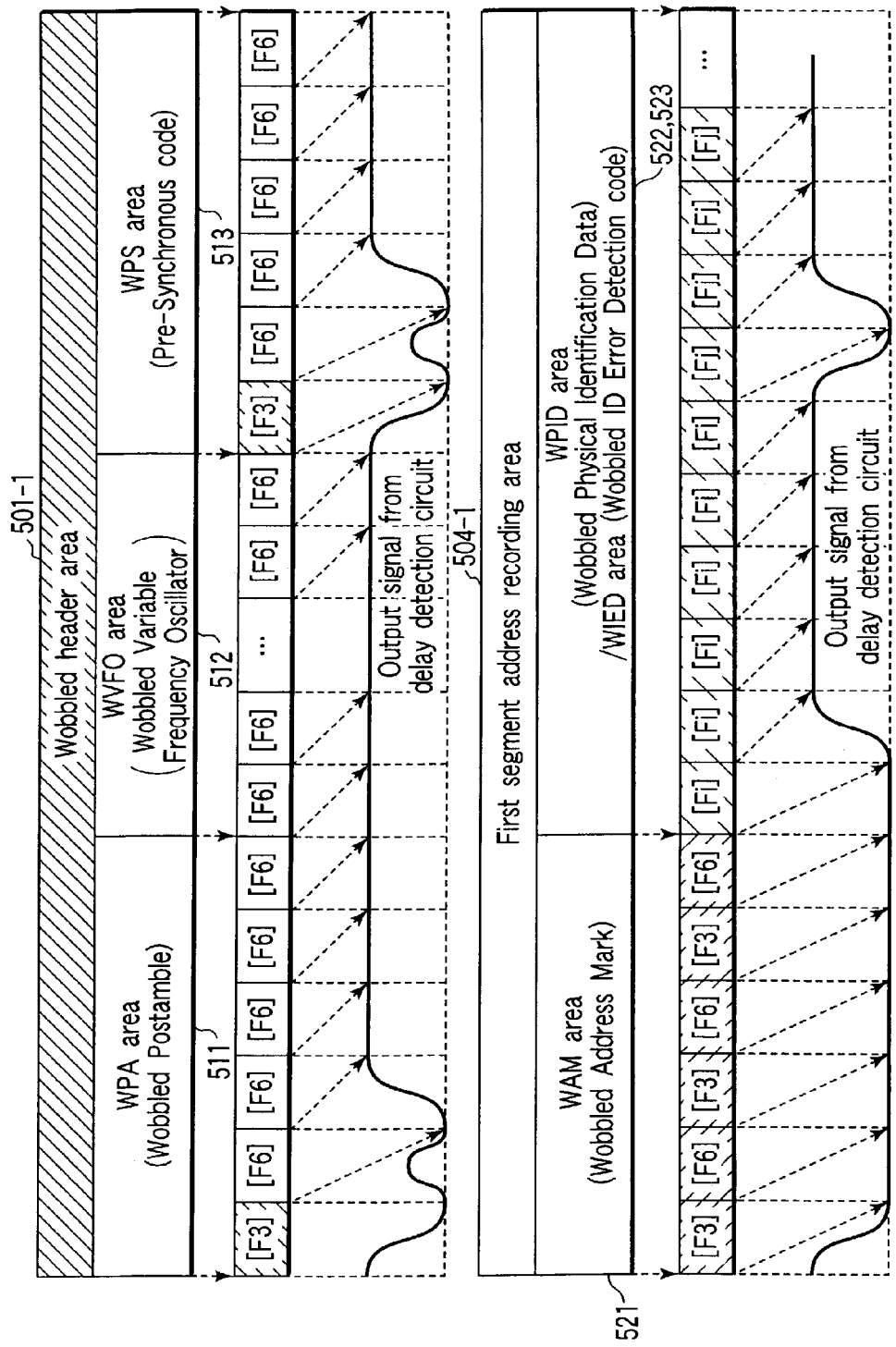
FIG. 18 is a view showing the relationship between the wobble pattern shown in FIG. 16 and the delay detection circuit output signal.

A modification will be described. FIG. 16 shows a modification of the wobble pattern shown in FIG. 6. As a characteristic feature, the frequency is partially changed at the time slot interval Ts within one wobble pattern change period Tw. That is, the WPA area 511 has F3 only at the start and F6 at the remaining portions. The WPS area 513 has F3 only at the start and F6 at the remaining portions. The WAM area 521 has an alternate pattern of F3 and F6. FIG. 17 is a view for explaining the calculation mechanism in the delay detection circuit corresponding to the wobble pattern shown in FIG. 16. FIG. 18 is a view showing the relationship between the wobble pattern shown in FIG. 16 and the delay detection circuit output signal. As the characteristic feature, the delay detection output is 0 at the boundary where the frequency changes at the time slot interval Tw. In addition, "delay detection output=0" continues in an area where the frequency always changes.

The effects of the above-described present invention will be summarized. In an information storage medium of the next generation, the density further increases. To record control information on such an information storage medium of the next generation by track displacement, the control information must be recorded in a very small track length. In other words, in the information storage medium of the next generation, since data segments are laid out at a very small interval, control information by track displacement must cope with the data segments at the very small interval. The information storage medium of the present invention has a wobbled groove having a wobble period modulated by multi-frequency shift keying corresponding to playback control information. Accordingly, the playback control information can be recorded at high density. That is, the information storage medium of the present invention is suitable for a high density and can preferably be used as the information storage medium of the next generation.

Figure 19:
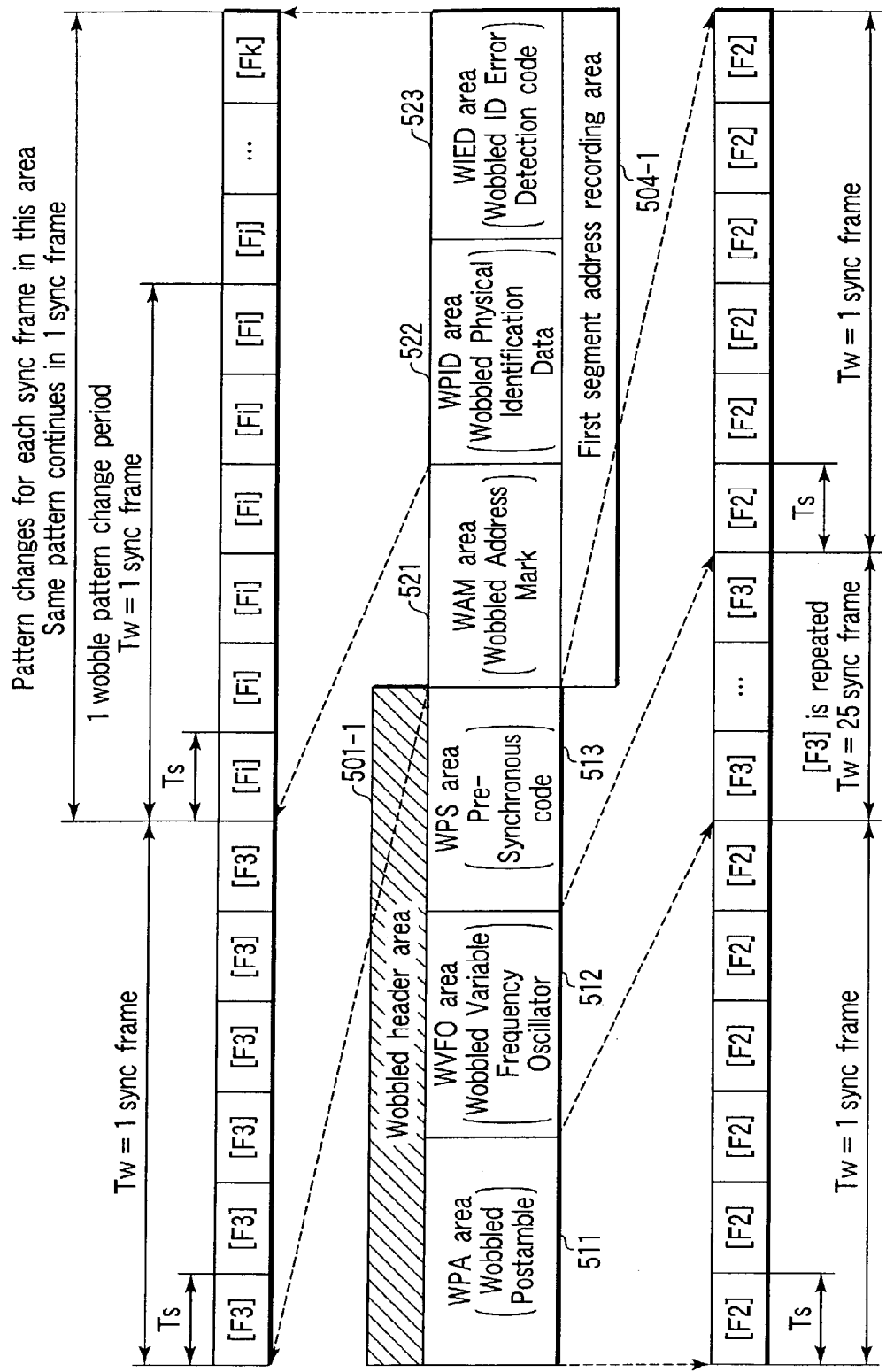
FIG. 19 is a view showing the wobbled data structure formed by 2-frequency MSK.
Figure 20:
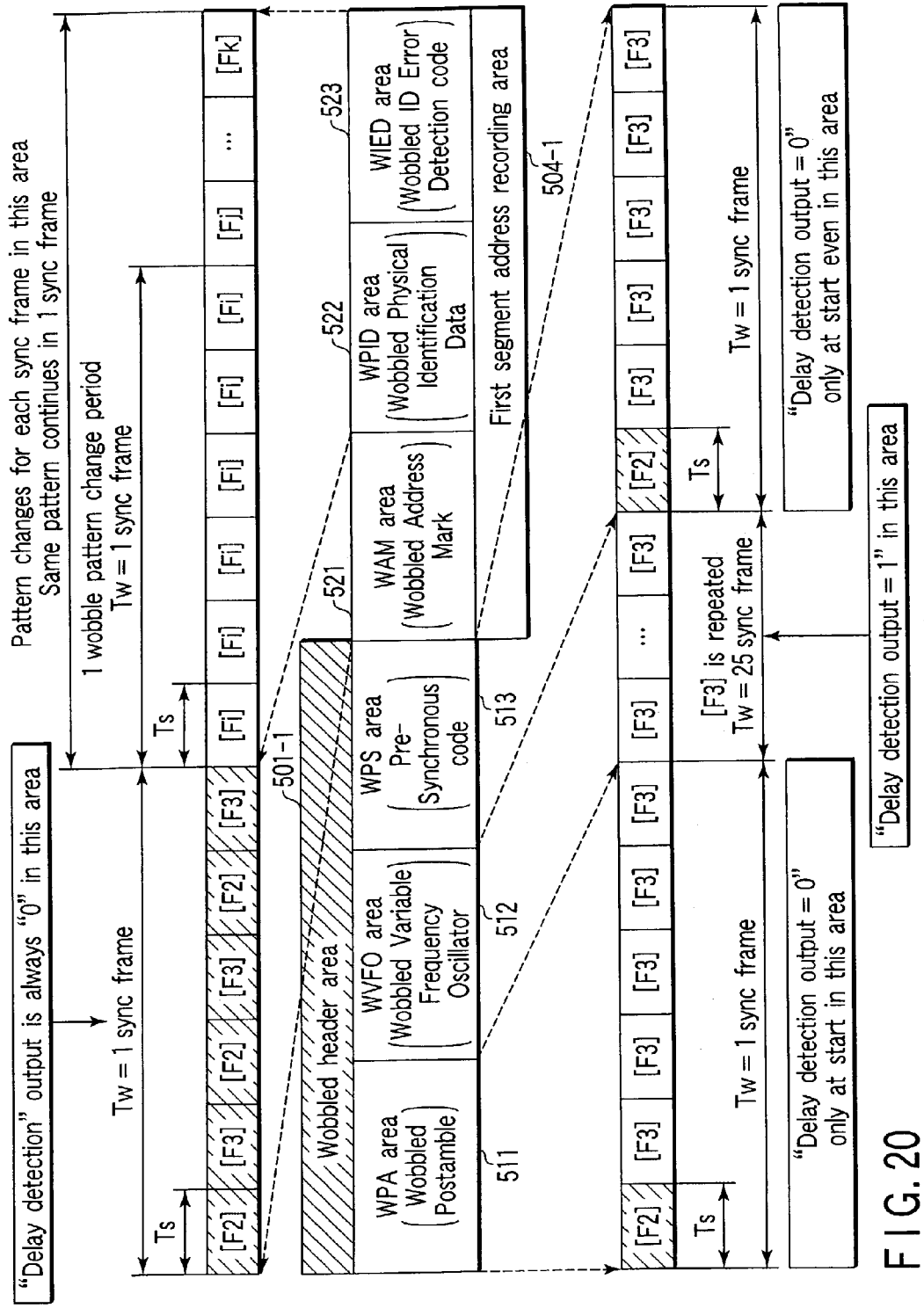
FIG. 20 is a view showing the wobbled data structure formed by 2-frequency MSK.

An information storage medium using multi-frequency shift keying has been described above. An information storage medium using 2-frequency shift keying will be described. That is, an information storage medium having a wobbled groove whose wobble period is modulated by 2-frequency shift keying corresponding to playback control information will be described. Frequencies contained in 2-frequency shift keying have an orthogonal relationship. FIGS. 19 and 20 are views showing the wobbled data structure formed by 2-frequency MSK. As a characteristic feature, F2 and F3 described above are employed. One period of F2 and 1.5 period of F3 are contained in one time slot Ts, In addition, in any pattern, the frequency changes only at the turn of one wobble pattern change period Tw. As a result, the delay detection output is 0 at the boundary between the areas and is always 1 in each area.

As described above, the data structure of the present invention can be applied not only to 4-frequency MFSK but also to any FSK (Frequency Shift Keying) scheme using a plurality of frequencies having an orthogonal relationship. As described above, as a characteristic feature, the wobble pattern has a predetermined frequency in one symbol (one wobbled word) period Tw, and, the frequency changes only at the turn of the wobble pattern change period Tw. As shown in the third column of FIG. 19, in the WPA area 511, the F2 pattern is repeated for one sync frame. In the WVFO area 512, the F3 pattern is repeated for 25 sync frames. In the WPS area 513, F2 is repeated for one sync frame. As shown in the first column of FIG. 19, the WAM area 521 has the F3 patterns for one sync frame. The WPID area 522 has a pattern in which the F2 or F3 pattern obtained by encoding address data changes for each sync frame, i.e., for each symbol (each wobbled word) period Tw. The WIED area 523 *also has a pattern in which the F*2 or F3 pattern corresponding to the error correction code changes for each sync frame, i.e., for each symbol (each wobbled word) period Tw. The two frequency patterns F2 and F3 have an orthogonal relationship. For this reason, the end of data for each sync frame can easily be detected by using the delay detection circuit 550, as shown in FIG. 6. More specifically, when one symbol (one wobbled word) period Tw serving as the switching unit of frequencies and the time slot Ts satisfy Tw=LTs, and frequencies having an orthogonal relationship are selected, the boundary between symbols (wobbled words) can be detected by the delay detection circuit 550.

The purpose of use of the wobbled signal and the required characteristic of each signal will be summarized.

≦Layout Position (Appearance Frequency) of Wobbled Header Area in Direction of Track>

Purpose of use: Spindle motor rotational speed control.

Required characteristic: The rotational speed control accuracy of the motor is ±1% or more by the recording control strategy.

≦Information in Wobbled Header>

Purpose of use: (1) Extraction of the recording reference clock. (2) Initial pull-in of address data read PLL clock.

Required characteristic: (1) The wobbled header position can easily be detected. A high recording reference clock extraction accuracy is required. The repetitive number of wobbles in an area is large. (2) The wobbled header must continue beyond the initial pull-in enable period.

≦Information in Address Data>

Purpose of use: (1) Extraction of the address data read reference clock. (2) Support of recording reference clock. (3) Read of address data.

Required characteristic: (1) The read reference clock extraction accuracy can be relatively low. (2) When the information is to be used to support extraction of the recording reference clock, a relatively low accuracy is allowable. (3) A run-length constraint in quaternary-to-binary conversion is necessary. If a pattern continues for a long time, the extraction accuracy of the wobble pattern change period Tw becomes low.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information storage medium including a wobbled groove, wherein
   the wobbled groove wobbles in a radial direction,
   the wobbled groove has a wobble period which is based on multi-frequency shift keying corresponding to playback control information, the multi-frequency shift keying including 2-frequency shift keying,
   the playback control information contains address data,
   the playback control information has a one wobble-word length corresponding to a wobbled pattern change period of the wobbled groove,
   physical sector data recorded along the wobbled groove has a one-sync-frame length corresponding to the wobbled pattern change period,
   a one-physical-sector-data length corresponds to a one-address-data length the multi-frequency shift keying contains frequencies each of which satisfies orthogonal conditions,
   a minimum time slot interval within which each of the frequencies satisfies the orthogonal conditions is defined as Ts,
   a difference between a wobble signal obtained from the wobbled groove and a delayed wobble signal is integrated for a length of the wobbled pattern change period, the delayed wobble signal being obtained by delaying the wobble signal by Ts,
   a point of time when symbols indicating the playback control information are switched is detected by integrating the difference, and
   the symbols are derived from the wobble signal based on a detected point of time.

2. An information recording apparatus for recording information on an information storage medium having a wobbled groove, wherein a length of a wobble period i modulated by multi-frequency shift keying corresponding to playback control information and including 2-frequency shift keying comprising:
   a read section configured to read the playback control information from the wobble period of the wobbled groove; and
   a recording section configured to record target physical sector data at a target position along the wobble groove on the basis of the playback control information read by the read section,
   the recording section recording physical sector data which has a one-sync-frame length corresponding to a wobbled pattern change period of the wobbled groove,
   the playback control information having a one-wobble-word lenght which corresponds to the wobbled pattern chance period,
   a one-physical-sector-data length corresponding to a one-address-data length, the multi-frequency shift keying containing frequencies each of which satisfies orthogonal conditions,
   a minimum time slot interval within which each of the frequencies satisfies the orthogonal conditions being defined as Ts,
   the reading section integrating a difference between a wobble signal obtained from the wobbled groove and a delayed wobble signal for a length of the wobbled pattern change period, the delayed wobble signal being obtained by delaying the wobble signal by Ts,
   a point of time when symbols indicating the playback control information are switched being detected by integrating the difference, and
   the symbols being derived from the wobble signal based on a detected point of time.

3. An information playback apparatus for playing back information from an information storage medium having a wobbled groove, wherein a lenght of a wobble period is modulated by multi-frequency shift keying corresponding to playback control information and including 2-frequency shift keying comprising:
   a read section configured to read the playback control information from the wobble period of the wobbled groove; and
   a playback section configured to play back target physical sector data at a target position alone the wobbled groove, on the basis of the playback control information read by the read section,
   physical sector data having one-sync-frame length corresponding to a wobbled pattern change period of the wobbled groove,
   the playback control information having a one-wobble-word length corresponding to the wobbled pattern change period,
   a one-physical-sector-data length corresponding to a one-address-data length, the multi-frequency shift keying containing frequencies each of which satisfies orthogonal conditions,
   a minimum time slot interval within which each of the frequencies satisfies the orthogonal conditions being defined as Ts,
   the reading section integrating difference between a wobble signal obtained from the wobbled groove and a delayed wobble signal for a length of the wobbled pattern change period, the delayed wobble signal being obtained by delaying the wobble signal by Ts,
   a point of time when symbols indicating the playback control information are switched being detected by integrating the difference,
   the symbols being derived from the wobble signal based on a detected point of time.

* * * * *